(12) United States Patent
Akaiwa et al.

(10) Patent No.: US 11,002,495 B2
(45) Date of Patent: May 11, 2021

(54) DISTRIBUTOR AND HEAT EXCHANGER

(71) Applicant: Mitsubishi Electric Corporation, Tokyo (JP)

(72) Inventors: Ryota Akaiwa, Tokyo (JP); Shinya Higashiiue, Tokyo (JP); Yuta Komiya, Tokyo (JP); Tsuyoshi Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 16/325,035

(22) PCT Filed: Oct. 26, 2016

(86) PCT No.: PCT/JP2016/081754
§ 371 (c)(1),
(2) Date: Feb. 12, 2019

(87) PCT Pub. No.: WO2018/078746
PCT Pub. Date: May 3, 2018

(65) Prior Publication Data
US 2020/0018528 A1    Jan. 16, 2020

(51) Int. Cl.
*F28F 9/02* (2006.01)
*F28D 1/053* (2006.01)
(Continued)

(52) U.S. Cl.
CPC ........ *F28F 9/0221* (2013.01); *F28D 1/05366* (2013.01); *F28F 1/126* (2013.01);
(Continued)

(58) Field of Classification Search
CPC ............ F24F 2013/227; F28D 1/05316; F28D 1/05366; F28D 2021/0071; F28F 1/126;
(Continued)

(56) References Cited

U.S. PATENT DOCUMENTS 7,367,203 B2 *  5/2008  Katoh ................... F28F 9/0221
                                                        62/515
7,650,935 B2 *  1/2010  Demuth ................ F28F 9/0221
                                                        165/176
(Continued)

FOREIGN PATENT DOCUMENTS

EP    2 998 683 A1    3/2016
EP    3 018 441 A1    5/2016
(Continued)

OTHER PUBLICATIONS

Office Action dated Mar. 24, 2020 issued in corresponding JP patent application No. 2018-546990 (with English translation).
(Continued)

*Primary Examiner* — Eric S Ruppert
*Assistant Examiner* — Hans R Weiland
(74) *Attorney, Agent, or Firm* — Posz Law Group, PLC

(57) ABSTRACT

A distributor includes a first member having a plurality of first through holes spaced apart from each other in the first direction, a second member having a first groove facing each of the plurality of first through holes, and a third member having at least one second groove facing at least one of the plurality of first through holes. The first groove extends in the first direction. The first space inside a groove is connected to a second space inside at least one second groove through a third space inside each of the plurality of first through holes. The third space is higher in flow path resistance than the first space and the second space.

16 Claims, 17 Drawing Sheets

(51) Int. Cl.
  *F28F 1/12* (2006.01)
  *F28F 9/22* (2006.01)
  *F28D 21/00* (2006.01)

(52) U.S. Cl.
  CPC ........ *F28F 9/0278* (2013.01); *F28D 1/05316* (2013.01); *F28D 2021/0071* (2013.01); *F28F 9/22* (2013.01); *F28F 2009/222* (2013.01)

(58) Field of Classification Search
  CPC .......... F28F 9/0221; F28F 9/0278; F28F 9/22; F28F 17/005; F28F 2009/222; F28F 2250/06; F28F 2265/22
  See application file for complete search history.

(56) References Cited

U.S. PATENT DOCUMENTS

| | | | | |
|---|---|---|---|---|
| 9,103,598 | B2* | 8/2015 | Bellenfant | F28F 9/0221 |
| 2003/0188857 | A1* | 10/2003 | Kawakubo | F28F 9/0278 |
| | | | | 165/174 |
| 2005/0284621 | A1* | 12/2005 | Katoh | F28F 9/0278 |
| | | | | 165/174 |
| 2008/0028788 | A1* | 2/2008 | Higashiyama | F28F 9/262 |
| | | | | 62/515 |
| 2008/0092587 | A1 | 4/2008 | Gorbounov et al. | |
| 2008/0202153 | A1* | 8/2008 | Watanabe | F28F 9/0278 |
| | | | | 62/498 |
| 2009/0266104 | A1* | 10/2009 | Ichiyanagi | F28F 9/0278 |
| | | | | 62/498 |
| 2013/0126140 | A1 | 5/2013 | Park et al. | |
| 2017/0328638 | A1* | 11/2017 | Wu | F28F 9/0221 |

FOREIGN PATENT DOCUMENTS

| | | | | |
|---|---|---|---|---|
| JP | 2004-003810 | A | 1/2004 | |
| JP | 2007-093025 | A | 4/2007 | |
| JP | 2008-116084 | A | 5/2008 | |
| JP | 2008-528943 | A | 7/2008 | |
| JP | 2015-203506 | A | 11/2015 | |
| WO | WO-2006094583 | A1 * | 9/2006 | .......... F28D 1/0476 |
| WO | 2014/091747 | A1 | 6/2014 | |

OTHER PUBLICATIONS

Extended European Search Report dated Oct. 11, 2019 issued in corresponding EP patent application No. 16920138.1.
International Search Report of the International Searching Authority dated Jan. 24, 2017 for the corresponding International application No. PCT/JP2016/081754 (and English translation).
Office Action dated Aug. 21, 2620 issued in correspsnding CN patent applicatisn No. 201680089982.3 (with English translation).

* cited by examiner

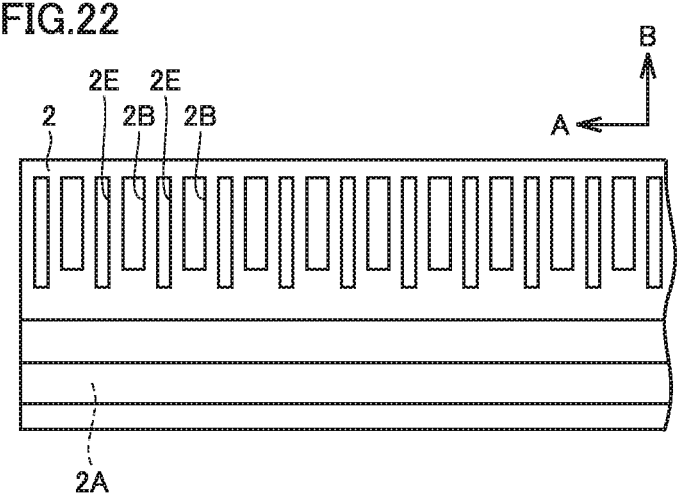
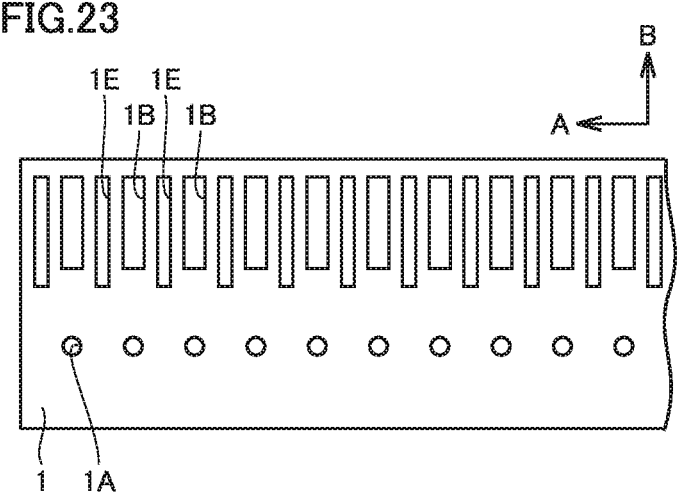

FIG.34
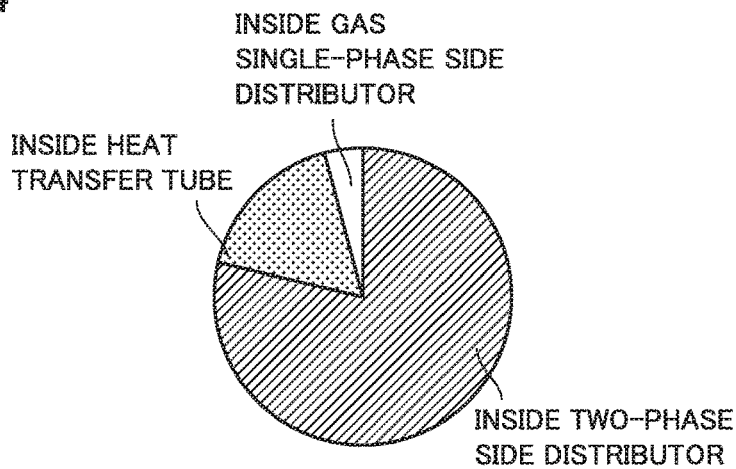
WEIGHT RATIO OF REFRIGERANT IN CONVENTIONAL VERTICAL HEAT EXCHANGER
(A)
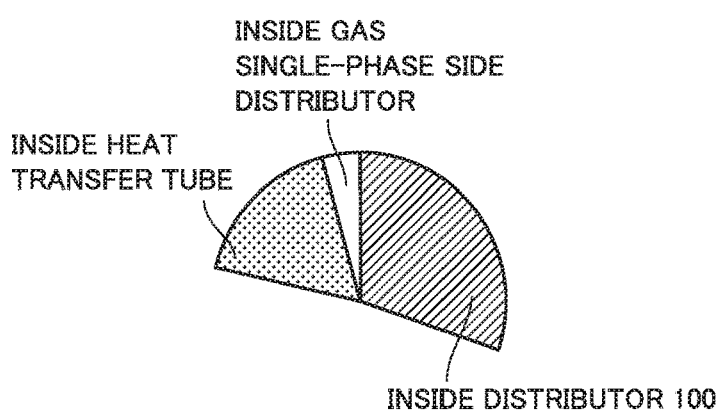
WEIGHT RATIO OF REFRIGERANT IN HEAT EXCHANGER INCLUDING DISTRIBUTOR ACCORDING TO FIRST EMBODIMENT
(B)
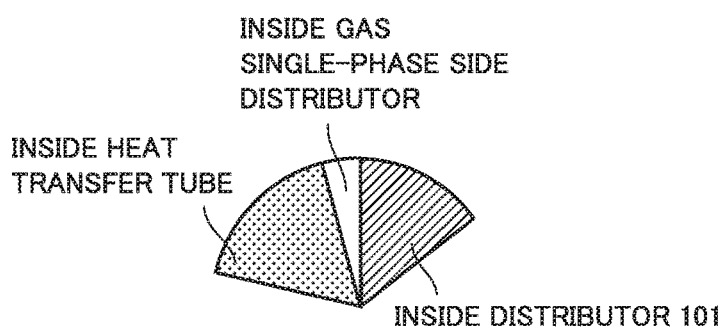
WEIGHT RATIO OF REFRIGERANT IN HEAT EXCHANGER INCLUDING DISTRIBUTOR ACCORDING TO SECOND EMBODIMENT
(C)

DISTRIBUTOR AND HEAT EXCHANGER

CROSS REFERENCE TO RELATED APPLICATION

This application is a U.S. national stage application of International Application PCT/JP2016/081754, filed on Oct. 26, 2016, the contents of which are incorporated herein by reference.

TECHNICAL FIELD

The present invention relates to a distributor and a heat exchanger, and particularly to: a distributor configured to distribute refrigerant to each of a plurality of heat transfer tubes disposed to extend in an up-down direction; and a heat exchanger including the distributor and the plurality of heat transfer tubes.

BACKGROUND

There are a known horizontal distributor configured to distribute refrigerant to each of a plurality of heat transfer tubes disposed to extend in the up-down direction, and also a known vertical heat exchanger including the horizontal distributor and the plurality of heat transfer tubes. In the vertical heat exchanger, the plurality of heat transfer tubes are disposed to be spaced apart from each other in the first direction extending in the horizontal direction. The conventional horizontal distributor includes a circle pipeline extending in the first direction in order to distribute refrigerant to each of the plurality of heat transfer tubes.

Japanese Patent Laying-Open No. 2015-203506 discloses a heat exchanger including: a header formed of a double tube disposed such that the axis direction extends in the horizontal direction; and a flat tube disposed such that the long-side direction extends in the vertical direction.

PATENT LITERATURE

PTL 1: Japanese Patent Laying-Open No. 2015-203506

For the conventional vertical heat exchanger as described above, however, it was difficult to reduce the volume of the horizontal distributor. This is due to the following reasons. Specifically, in the conventional vertical heat exchanger, the inner diameter of the circular tube inside the distributor in the cross section perpendicular to the first direction needs to be set at a value equal to or greater than the inner diameter of each heat transfer tube. Thus, irrespective of whether the heat transfer tube is a circular tube or a flat tube, it is difficult to reduce the volume of the circular tube.

Particularly, in the conventional vertical heat exchanger including heat transfer tubes each formed as a flat tube, the proportion of the volume of the horizontal distributor to the entire volume of the vertical heat exchanger is greater by the amount corresponding to reduction of the total volume of the plurality of heat transfer tubes than that in the case of the vertical heat exchanger including heat transfer tubes each formed as a circular tube.

When the above-described vertical heat exchanger serves as an evaporator, for example, the horizontal distributor disposed above the heat transfer tubes of the vertical heat exchanger serves as a gas single-phase side horizontal distributor while the horizontal distributor disposed below the heat transfer tubes serves as a two-phase side horizontal distributor. The degree of dryness of the refrigerant flowing through the gas single-phase side horizontal distributor is equal to 1 (see FIG. 32). For example, gas-phase refrigerant having a density of 20 kg/m³ flows through the gas single-phase side horizontal distributor (see FIG. 33). The degree of dryness of the refrigerant flowing through the two-phase side horizontal distributor is less than 1 (see FIG. 32). For example, gas-liquid two-phase refrigerant having a density of 1200 kg/m³ flows through the two-phase side horizontal distributor (see FIG. 33). Accordingly, in the conventional vertical heat exchanger including the conventional horizontal distributor having a circle pipeline as a two-phase side horizontal distributor, the volume of the two-phase side horizontal distributor is greater than the total volume of the plurality of flat tubes while the weight of the refrigerant inside the two-phase side horizontal distributor is greater than the weight of the refrigerant inside the plurality of flat tubes (see FIG. 34 (A)). Particularly when the vertical heat exchanger is applied to an indoor unit of an air conditioner for home use, the vertical heat exchanger has a configuration longer in the horizontal direction than in the up-down direction. Thus, the weight of the refrigerant inside the distribution tube extending in the horizontal direction is significantly greater than the weight of the refrigerant inside the flat tube extending in the up-down direction.

In other words, for the above-described conventional vertical heat exchangers, it was difficult to sufficiently reduce the weight of the refrigerant inside the horizontal distributor. Accordingly, it was difficult to sufficiently reduce the weight of the refrigerant in the entire heat exchanger.

SUMMARY

The present invention has been made in order to solve the above-described problems. A main object of the present invention is to provide: a distributor configured to distribute refrigerant to each of a plurality of heat transfer tubes that extend in the up-down direction and reduced in volume as compared with conventional horizontal distributors; and a heat exchanger including the distributor.

A distributor according to the present invention is configured to distribute refrigerant to each of a plurality of heat transfer tubes extending in an up-down direction, the plurality of heat transfer tubes being spaced apart from each other in a first direction crossing the up-down direction. The distributor includes: a first member having a plurality of first through holes spaced apart from each other in the first direction; a second member having a first groove facing each of the plurality of first through holes; and a third member having at least one second groove provided to face at least one of the plurality of first through holes. The first groove extends in the first direction. A first space inside the first groove and a second space inside the at least one second groove are connected to each other through a third space inside each of the plurality of first through holes. The third space is higher in flow path resistance than the first space and the second space.

According to the present invention, it becomes possible to provide: a distributor configured to distribute refrigerant to each of a plurality of heat transfer tubes that extend in an up-down direction and reduced in volume as compared with the conventional horizontal distributor; and a heat exchanger including the distributor.

BRIEF DESCRIPTION OF DRAWINGS

FIG. 22 is a plan view of the second member of the distributor according to the ninth embodiment.

FIG. 23 is a plan view of the first member of the distributor according to the ninth embodiment.

FIG. 34 (A) is a circle graph showing the weight ratio of refrigerant inside a heat transfer tube, an upper horizontal distributor and a lower horizontal distributor of the conventional vertical heat exchanger exhibiting the distribution of the degree of dryness and the density distribution that are shown in FIG. 32 and FIG. 33, respectively.

FIG. 34 (B) is a circle graph showing the weight ratio of gas-liquid two-phase refrigerant flowing through the distributor according to the first embodiment, on the condition that the weight of the gas-liquid two-phase refrigerant flowing through the heat transfer tube is equal to that of the conventional vertical heat exchanger shown in FIG. 34 (A).

FIG. 34 (C) is a circle graph showing the weight ratio of gas-liquid two-phase refrigerant flowing through the distributor according to the third embodiment, on the condition that the weight of the gas-liquid two-phase refrigerant flowing through the heat transfer tube is equal to that of the conventional vertical heat exchanger shown in FIG. 34 (A).

DESCRIPTION OF EMBODIMENTS

Figure 1:
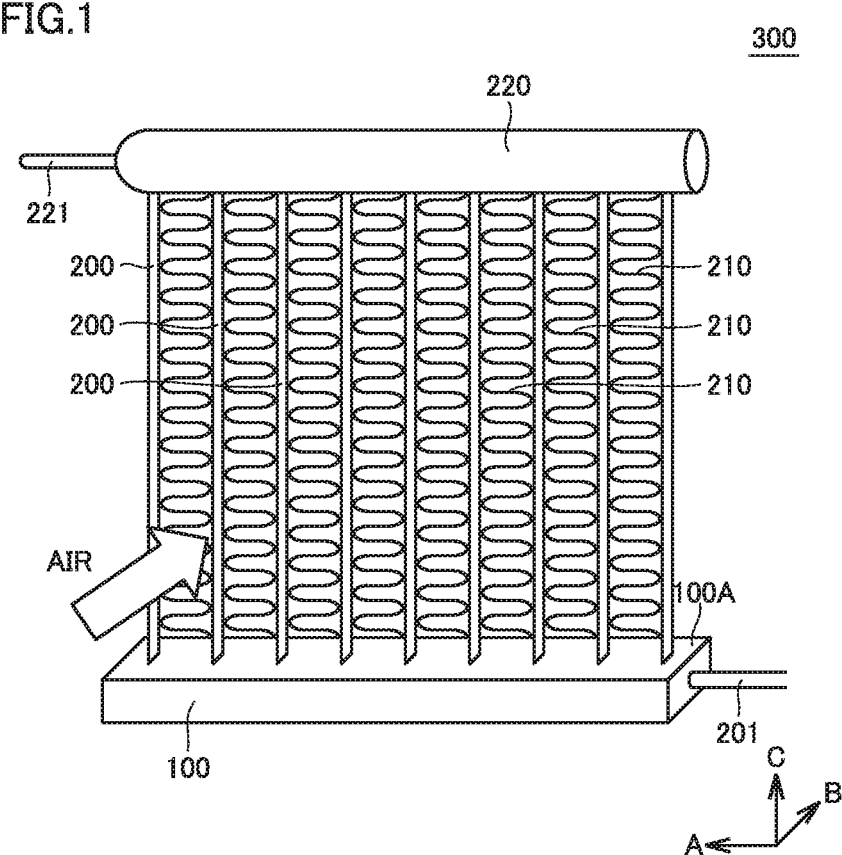
FIG. 1 is a perspective view of a heat exchanger according to the first embodiment.

The embodiments of the present invention will be hereinafter described with reference to the accompanying drawings, in which the same or corresponding components are designated by the same reference characters, and the description thereof will not be repeated.

First Embodiment

<Configuration of Heat Exchanger>

Referring to FIG. 1, a heat exchanger 300 according to the first embodiment will be hereinafter described. For the sake of explanation, a first direction A, a second direction B and an up-down direction C are employed. In FIG. 1, first direction A corresponds to the horizontal direction in which distributor 100 extends. Second direction B corresponds to the horizontal direction and is orthogonal to first direction A. Up-down direction C extends in the vertical direction, for example. First direction A and second direction B are orthogonal to up-down direction C.

Heat exchanger 300 includes a distributor 100, a plurality of heat transfer tubes 200, a plurality of fins 210, and a distributor 220, each of which will be described later.

Distributor 100 extends in first direction A. Distributor 100 is disposed below the plurality of heat transfer tubes 200, the plurality of fins 210 and distributor 220. Distributor 100 is connected to a refrigerant pipe 201.

The plurality of heat transfer tubes 200 each extend in up-down direction C so as to be spaced apart from each other in first direction A. Each of the plurality of heat transfer tubes 200 may have any configuration and may be formed as a flat tube, for example. Each of the plurality of heat transfer tubes 200 is disposed on an upper surface 100A (described later) of distributor 100. Each of the plurality of heat transfer tubes 200 is provided with a plurality of refrigerant paths that are spaced apart from each other in second direction B. The plurality of refrigerant paths in each of the plurality of heat transfer tubes 200 are connected to a second space S2 through each of a plurality of third through holes 2B provided on upper surface 100A of distributor 100, which will be described later. The plurality of refrigerant paths in each of the plurality of heat transfer tubes 200 are connected to distributor 100.

Each of the plurality of fins 210 is disposed between two heat transfer tubes 200 adjacent to each other in first direction A and connected thereto. Each of the plurality of fins 210 is formed as a corrugated fin, for example.

Distributor 220 may be a conventional horizontal distributor, for example. Distributor 220 includes a circular tube, for example. This circular tube is connected to the plurality of refrigerant paths in each of the plurality of heat transfer tubes. Distributor 220 is connected to a refrigerant pipe 221.

<Configuration of Distributor>

Figure 2:
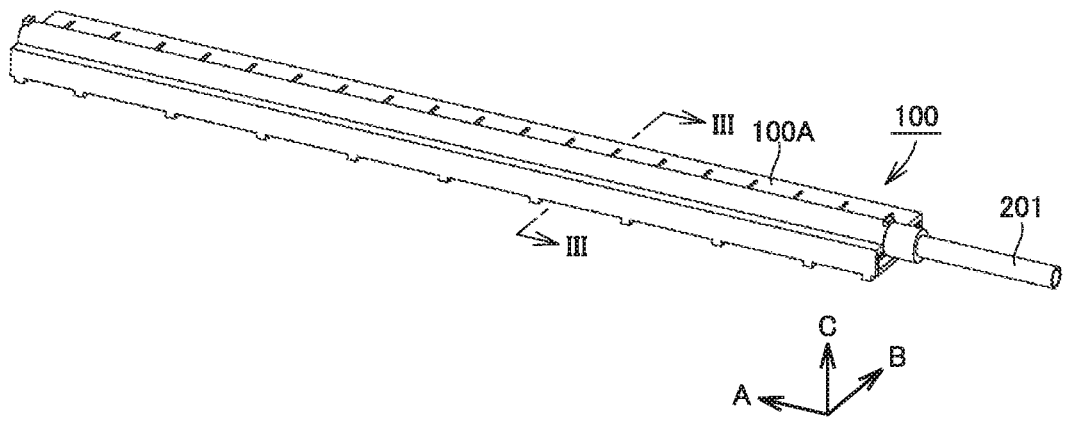
FIG. 2 is a perspective view of a distributor according to the first embodiment.

Then, distributor 100 will be described with reference to FIGS. 2 to 4. Distributor 100 mainly includes a first member 1, a second member 2, a third member 3, and a fourth member 4. First member 1, second member 2, third member 3, and fourth member 4 each are formed of a plate-shaped member, for example. Each of first member 1, second member 2, third member 3, and fourth member 4 has a surface having a relatively large area (which will be hereinafter referred to as a main surface) that is disposed perpendicular to up-down direction C. When first member 1, second member 2, third member 3, and fourth member 4 are seen in up-down direction C, the outline shape of each member has a rectangular shape, for example, in which each long-side direction extends in first direction A. Second member 2, first member 1, third member 3, and fourth member 4 are disposed in this order sequentially from top to bottom.

First member 1 is provided with a plurality of first through holes 1A spaced apart from each other in first direction A. Each of the plurality of first through holes 1A penetrates through both the above-mentioned main surfaces of first member 1. The plurality of first through holes 1A have the same configuration, for example. The hole axis of first through hole 1A extends in up-down direction C, for example. The planar shape of first through hole 1A as seen in up-down direction C is a circular shape, for example. First through hole 1A is smaller in opening area than second through hole 3A, which will be described later. The total opening area of the plurality of first through holes 1A is smaller than the opening area of second through hole 3A, for example.

Figure 3:
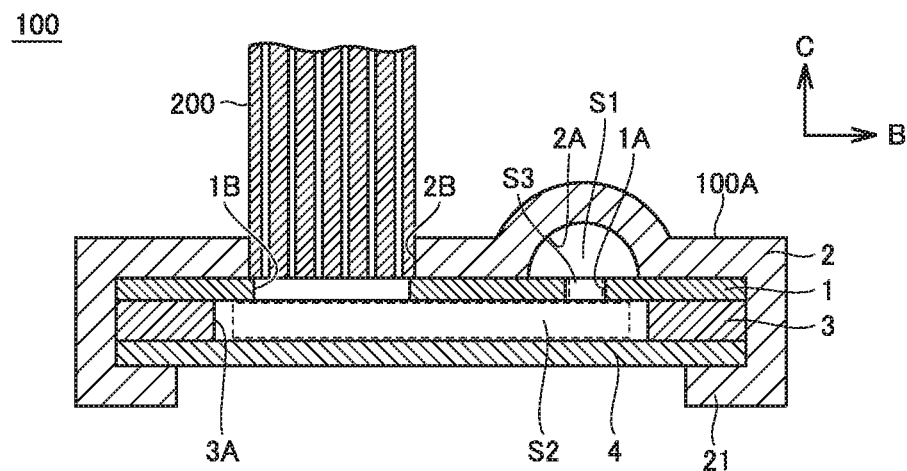
FIG. 3 is a cross-sectional view taken along an arrow in FIG. 2.
Figure 4:
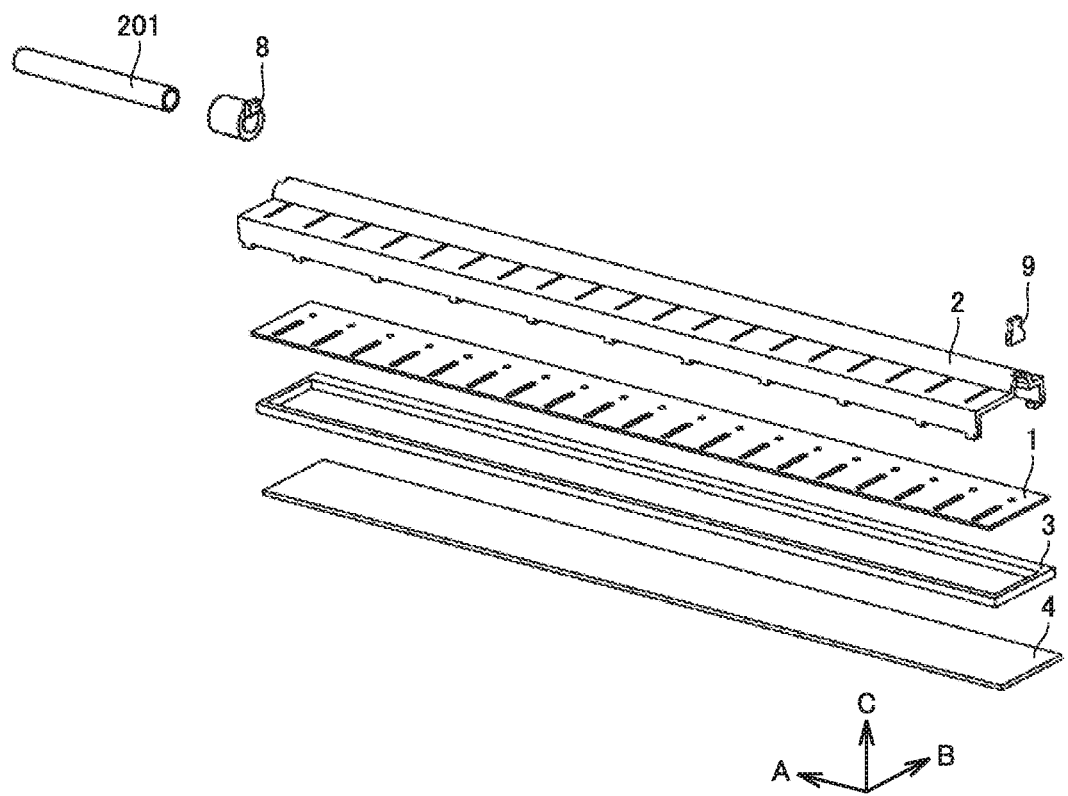
FIG. 4 is an exploded perspective view of the distributor shown in FIG. 2.

As shown in FIGS. 3 and 4, first member 1 is provided with a plurality of fourth through holes 1B spaced apart from each other in first direction A. Each of the plurality of fourth through holes 1B penetrates through both the above-mentioned main surfaces of first member 1. Each of the plurality of first through holes 1A is spaced apart from each of the plurality of fourth through holes 1B in second direction B.

The plurality of fourth through holes 1B have the same configuration, for example. The hole axis of each fourth through hole 1B extends in up-down direction C, for example. The planar shape of fourth through hole 1B as seen in up-down direction C may be any shape having a long-side direction extending in second direction B and a short-side direction extending in first direction A, and may be an approximately elliptical shape, for example.

The inner diameter of fourth through hole 1B in second direction B is longer than the inner diameter of each of first through holes 1A in second direction B, and shorter than the length of heat transfer tube 200 in second direction B. The inner diameter of fourth through hole 1B in first direction A is approximately equal to the inner diameter of first through hole 1A in first direction A, for example. The hole axis of first through hole 1A is in parallel to the hole axis of fourth through hole 1B, for example.

As shown in FIGS. 3 and 4, second member 2 includes a groove 2A (the first groove) facing each of the plurality of first through holes 1A. Groove 2A is formed to be recessed in one of the above-mentioned main surfaces of second member 2 that faces the plurality of first through holes 1A. The other main surface of second member 2 that is located on the opposite side of this one of the main surfaces is formed as upper surface 100A of distributor 100, which will be described later.

Groove 2A extends in first direction A. Second member 2 includes a bent portion. Groove 2A is located inside the bent portion. This bent portion is bent such that one part of the main surface of second member 2 faces the other part thereof at a distance from each other in second direction B. Groove 2A is located inside the bent portion. The opening end of groove 2A faces downward.

The cross-sectional shape of groove 2A that is perpendicular to first direction A may be any shape, and may be a semicircular shape, for example. The length of the opening end of groove 2A in second direction B is longer than the inner diameter of first through hole 1A in second direction B. Groove 2A is spaced apart from each of the plurality of third through holes 2B in second direction B. A first space S1 is provided inside groove 2A.

As shown in FIGS. 3 and 4, third member 3 is provided with one second through hole 3A so as to face each of the plurality of first through holes 1A. One second through hole 3A penetrates through both the above-mentioned main surfaces of third member 3. The hole axis of second through hole 3A extends in up-down direction C. The planar shape of second through hole 3A as seen in up-down direction C is a rectangular shape, for example. The inner diameter of second through hole 3A in first direction A is longer than the inner diameter of second through hole 3A in second direction B. The inner diameter of second through hole 3A in first direction A is longer than the inner diameter of first through hole 1A in first direction A and the inner diameter of fourth through hole 1B in first direction A. The inner diameter of second through hole 3A in second direction B is longer than the total sum of the inner diameter of first through hole 1A in second direction B and the inner diameter of fourth through hole 1B in second direction B. The inner diameter of second through hole 3A in second direction B is longer than the length of the opening end of groove 2A in second direction B.

First space S1 extends in first direction A. Second space S2 is provided inside second through hole 3A of third member 3. Fourth member 4 covers the lower portion of second space S2. Second space S2 faces the plurality of first through holes 1A and the plurality of fourth through holes 1B. A third space S3 is provided inside each of the plurality of first through holes 1A. First space S1 and second space S2 are connected to each other through third space S3. In other words, first member 1 provides a partition between first space S1 and second space S2. Third space S3 is higher in flow path resistance than first space S1 and second space S2.

As shown in FIGS. 3 and 4, in distributor 100, second member 2 is configured as an outer member of distributor 100 and has upper surface 100A of distributor 100. Upper surface 100A is a main surface of second member 2 that is located on the opposite side of the above-mentioned one main surface facing the plurality of first through holes 1A. Upper surface 100A of second member 2 is provided with a plurality of third through holes 2B spaced apart from each other in first direction A. Each of the plurality of third through holes 2B faces second space S2 through fourth through hole 1B. The plurality of third through holes 2B have the same configuration, for example. The hole axis of each third through hole 2B extends in up-down direction C. The planar shape of third through hole 2B as seen in up-down direction C has a long-side direction and a short-side direction, for example. The long-side direction of third through hole 2B extends in second direction B. Each of the plurality of third through holes 2B is spaced apart from the above-described bent portion in second direction B. The inner diameter of third through hole 2B in second direction B is longer than the length of heat transfer tube 200 in second direction B. In other words, the inner diameter of third through hole 2B in second direction B is longer than the inner diameter of fourth through hole 1B in second direction B. When distributor 100 is seen in up-down direction C, the opening end of each of the plurality of third through holes 2B is disposed on the outside of the opening end of each of the plurality of fourth through holes 1B.

As shown in FIG. 3, the lower end of each of the plurality of heat transfer tubes 200 is introduced into each of the plurality of third through holes 2B, and is in contact with a part of the upper main surface of first member 1. In this case, the plurality of refrigerant paths in each of the plurality of heat transfer tubes 200 face second space S2 through fourth through hole 1B, but are not covered by first member 1.

As shown in FIG. 3, third space S3 is disposed on the same side of the plurality of third through holes 2B with respect to second space S2. Distributor 100 is provided therein with: a refrigerant path extending downward from first space S1 through third space S3 to second space S2; and, on the downstream side of this refrigerant path, a refrigerant path extending upward from second space S2 through each of the plurality of third through holes 2B to each of the plurality of heat transfer tubes 200.

As shown in FIG. 3, second member 2 serves to caulk first member 1, third member 3 and fourth member 4. Second member 2 has a caulking portion 21 formed by bending a plate-shaped member. Caulking portion 21 is bent so as to face, in up-down direction C, the portion having upper surface 100A and including groove 2A and the plurality of third through holes 2B. Caulking portion 21 is in contact with the lower main surface of fourth member 4.

As shown in FIG. 4, distributor 100 further includes an inflow portion 8 through which refrigerant flows into first space S1. Inflow portion 8 is connected to one end of groove 2A in first direction A, for example. Inflow portion 8 serves as a joint, for example, to connect one end of groove 2A in first direction A to an inflow pipe 201. The other end of groove 2A in first direction A is covered by a divider 9.

The length (thickness) of first member 1 in up-down direction C may be arbitrarily selected, and may be 0.5 mm or more and 10 mm or less, for example, or may be 1 mm, for example. The length (thickness) of second member 2 in up-down direction C may be arbitrarily selected, and may be 1 mm or more and 10 mm or less, for example, or may be 3 mm, for example. The length (thickness) of third member 3 in up-down direction C may be arbitrarily selected, and may be 1 mm or more and 10 mm or less, for example, or may be 3 mm, for example. The length (thickness) of fourth member 4 in up-down direction C may be arbitrarily selected, and may be 0.5 mm or more and 10 mm or less, for example, or may be 3 mm, for example.

<Functions and Effects>

In distributor 100, the refrigerant distributed to each of the plurality of heat transfer tubes 200 flows through first space S1, third space S3 and second space S2 sequentially in this order. First space S1 and second space S2 are partitioned by first member 1 provided with first through hole 1A. In other words, in distributor 100, the refrigerant path for spreading refrigerant is divided mainly into: first space S1 in which refrigerant is spread in first direction A; and second space S2 in which refrigerant is spread at least in second direction B. Accordingly, each of first space S1 and second space S2 may extend only in the direction in which refrigerant needs to be spread, and therefore, may be narrowed in the direction in which refrigerant does not need to be spread as compared with the direction in which refrigerant needs to be spread. Thus, the above-described refrigerant path in distributor 100 can be sufficiently reduced in volume as compared with the refrigerant path in the conventional horizontal distributor. In this way, also when heat exchanger 300 serves as an evaporator and gas-liquid two-phase refrigerant flows through distributor 100, the refrigerant inside distributor 100 can be sufficiently reduced in weight as compared with the conventional horizontal distributor. Also, the refrigerant in the entire heat exchanger 300 can be sufficiently reduced in weight as compared with the conventional vertical heat exchanger. Thereby, the weight of the refrigerant introduced into the refrigeration cycle apparatus including heat exchanger 300 equipped with distributor 100 is less than the weight of the refrigerant introduced into the refrigeration cycle apparatus including a vertical heat exchanger equipped with a conventional horizontal distributor. Consequently, heat exchanger 300 has less influence upon environments such as global warming by refrigerant than the conventional vertical heat exchanger.

Heat exchanger 300 is suitable for the indoor unit of an air conditioner for home use. Heat exchanger 300 may be configured to be longer in first direction A than in up-down direction C. Even by such a configuration, in heat exchanger 300, the refrigerant path extending in first direction A in distributor 100 is less in volume than the conventional horizontal distributor, so that the refrigerant inside distributor 100 can be reduced in weight as compared with the conventional vertical heat exchanger.

The length of first space S1 in second direction B in distributor 100 may be shorter than the length of the space in the second direction, through which refrigerant flows, in the conventional horizontal distributor, for example. The length of first space S1 in second direction B can be equal to or greater than the hole diameter of first through hole 1A and less than the length of each of the plurality of heat transfer tubes 200 in second direction B, for example. The volume of the refrigerant path inside distributor 100 can be set to be approximately 40% of the volume of the refrigerant path inside the conventional two-phase side horizontal distributor formed of a circular tube extending in the first direction, for example (see FIGS. 34 (A) and 34 (B)).

Furthermore, in the conventional horizontal distributor, the long-side direction of the refrigerant path extends in the first direction. Thus, it is difficult to uniformly distribute gas-liquid two-phase refrigerant in the first direction. This is because the gas-phase refrigerant that is relatively low in density in the gas-liquid two-phase refrigerant is less likely to receive inertial force as compared with the liquid-phase refrigerant that is relatively high in density, with the result that the gas-phase refrigerant is less likely to be spread in the first direction corresponding to the long-side direction of the refrigerant path.

In contrast, in distributor 100, the gas-liquid two-phase refrigerant distributed in first space S1 in first direction A flows through each of the plurality of first through holes 1A into second space S2. Third space S3 inside first through hole 1A is higher in flow path resistance than first space S1. Thus, the flow of the gas-liquid two-phase refrigerant from first space S1 to second space S2 is contracted by the plurality of first through holes 1A. At this time, the gas-liquid two-phase refrigerant inside first space S1 may be mixed. Furthermore, third space S3 inside first through hole 1A is higher in flow path resistance than second space S2. Thus, the refrigerant inside third space S3 is emitted into second space S2. Accordingly, the gas-liquid two-phase refrigerant inside second space S2 of distributor 100 is more uniformly distributed in first direction A than the gas-liquid two-phase refrigerant inside the conventional horizontal distributor. In other words, distributor 100 can further uniformly distribute gas-liquid two-phase refrigerant to each of the plurality of heat transfer tubes 200 spaced apart from each other in first direction A, as compared with the conventional horizontal distributor.

In distributor 100 described above, the gas-liquid two-phase refrigerant having flown into second space S2 and spread in second direction B may be distributed to each of the plurality of third through holes 2B having the long-side direction extending in second direction B. Accordingly, distributor 100 can uniformly distribute gas-liquid two-phase refrigerant to each of the plurality of refrigerant paths that are spaced apart from each other in second direction B inside each heat transfer tube 200 inserted into each of the plurality of third through holes 2B.

In distributor 100 described above, third space S3 is disposed on the same side of the plurality of third through holes 2B with respect to second space S2. Thus, in distributor 100, the circulation direction of the refrigerant is inverted inside second space S2. In other words, the refrigerant having flown from first space S1 through third space S3 into second space S2 is changed in its flowing direction in second space S2 facing fourth member 4, and then flows from second space S2 into third through hole 2B. Distributor 100 as described above can facilitate spreading of the gas-liquid two-phase refrigerant inside second space S2, thereby allowing more uniform distribution of the gas-liquid two-phase refrigerant to each of the plurality of heat transfer tubes 200.

In distributor 100 described above, the inner diameter of third through hole 2B in second direction B is longer than the length of each of the plurality of heat transfer tubes 200 in second direction B. The inner diameter of fourth through hole 1B in second direction B is shorter than the length of each of the plurality of heat transfer tubes 200 in second direction B. Each of the plurality of third through holes 2B faces second space S2 through fourth through hole 1B. In this way, the lower ends of the plurality of heat transfer tubes 200 each introduced into a corresponding one of the plurality of third through holes 2B come into contact with first member 1 provided with the plurality of fourth through holes 1B. In other word, first member 1 may serve as a stopper for the lower ends of the plurality of heat transfer tubes 200. In distributor 100, the inner diameter of fourth through hole 1B in second direction B may be longer than the length of each of the plurality of heat transfer tubes 200 in second direction B as long as second space S2 can be maintained. In this case, second member 2 of distributor 100 only has to be fixed to the plurality of heat transfer tubes 200 by an optional method.

Distributor 100 includes first member 1, second member 2, third member 3, and fourth member 4, each of which is formed of a plate-shaped member. Accordingly, the plurality of first through holes 1A, the plurality of second through holes 3A, the plurality of third through holes 2B, and the plurality of fourth through holes 1B each may be readily formed by press working. Furthermore, second member 2 serves to caulk first member 1, third member 3 and fourth member 4. Distributor 100 as described above may be manufactured readily and inexpensively as compared with the conventional horizontal distributor.

Second Embodiment

<Configuration of Distributor>

Then, a distributor 101 according to the second embodiment will be described with reference to FIGS. 5 to 7. Distributor 101 according to the second embodiment has basically the same configuration as that of distributor 100 according to the first embodiment, but is different therefrom in that third space S3 is disposed on the opposite side of the plurality of third through holes 7A with respect to second space S2.

Figure 5:
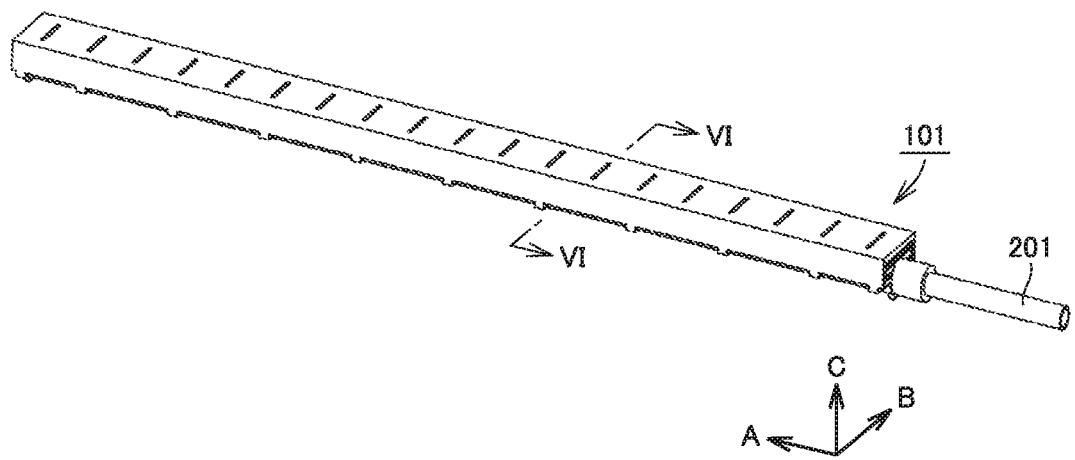
FIG. 5 is a perspective view of a distributor according to the second embodiment.
Figure 6:
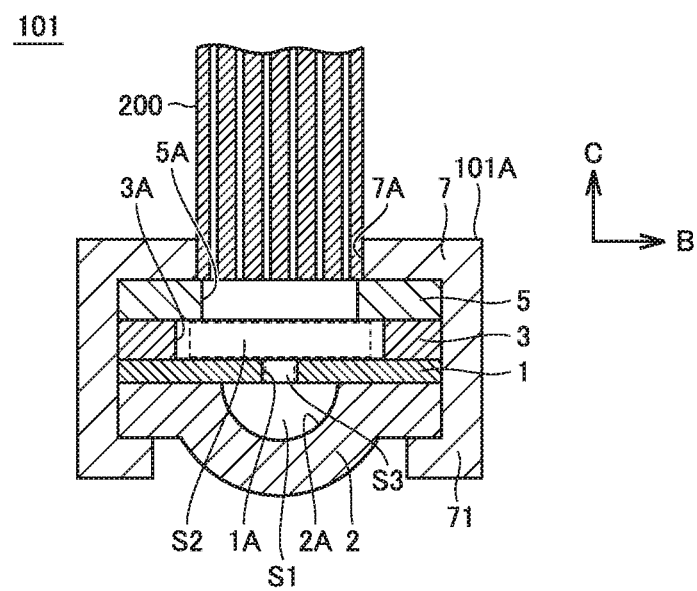
FIG. 6 is a cross-sectional view taken along an arrow VI-VI in FIG. 5.
Figure 7:
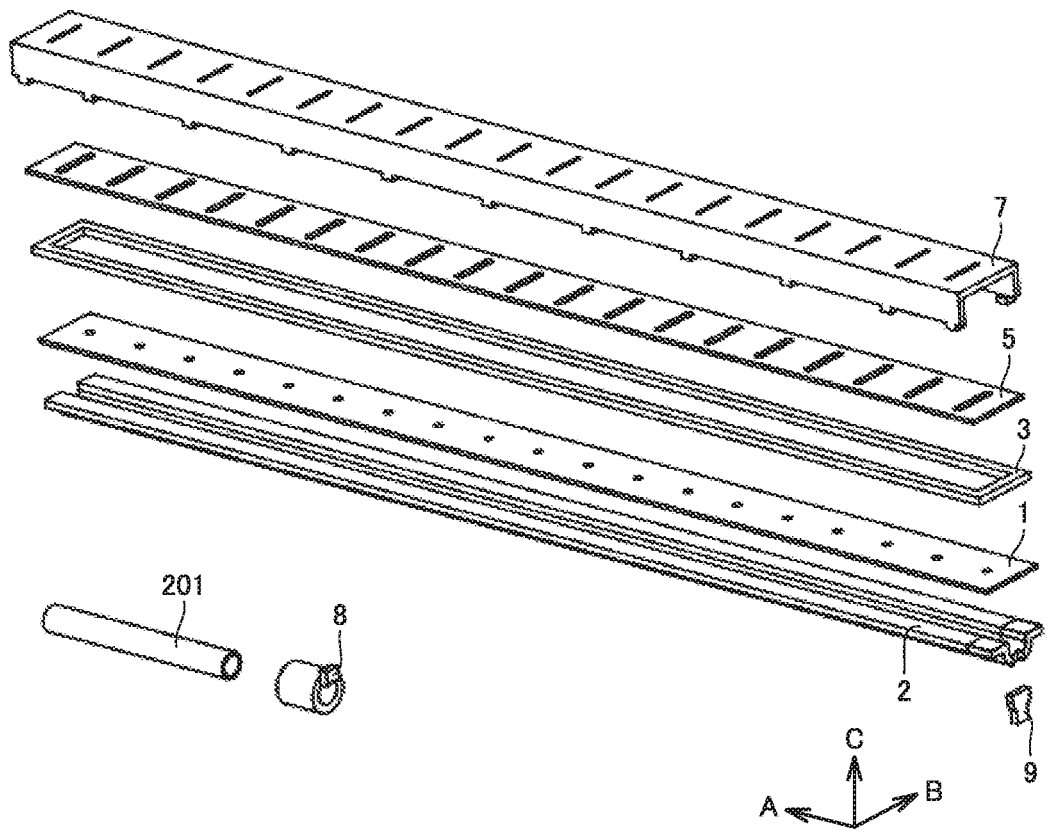
FIG. 7 is an exploded perspective view of the distributor shown in FIG. 5.

As shown in FIGS. 5 to 7, distributor 101 includes a first member 1, a second member 2, a third member 3, a fifth member 5, and a seventh member 7. First member 1, second member 2, third member 3, fifth member 5, and seventh member 7 each are formed of a plate-shaped member, for example. Each of first member 1, second member 2, third member 3, fifth member 5, and seventh member 7 has a surface having a relatively large area (hereinafter referred to as a main surface) that is disposed perpendicular to up-down direction C. When first member 1, second member 2, third member 3, fifth member 5, and seventh member 7 are seen in up-down direction C, the outer shape of each member is a rectangular shape, for example, having a long-side direction extending in first direction A. Seventh member 7, fifth member 5, third member 3, first member 1, and second member 2 are disposed in this order sequentially from top to bottom. In distributor 101, seventh member 7 is formed as an outer member.

As shown in FIGS. 6 and 7, first member 1 has basically the same configuration as that of first member 1 of distributor 100, but is different therefrom in that the plurality of fourth through holes 1B are not provided.

As shown in FIGS. 6 and 7, second member 2 has basically the same configuration as that of second member 2 of distributor 100, but is different therefrom in that second member 2 is not provided with a plurality of third through holes 2B and not formed as an outer member, and that the opening end of groove 2A faces upward. Second member 2 includes a bent portion that is bent downward to form a protruding shape. Groove 2A is provided inside this bent portion.

As shown in FIGS. 6 and 7, third member 3 has basically the same configuration as that of second member 2 of distributor 100.

As shown in FIGS. 6 and 7, fifth member 5 is provided with a plurality of fifth through holes 5A that are spaced apart from each other in first direction A. Each of the plurality of fifth through holes 5A penetrates through both the above-mentioned main surfaces of fifth member 5. The plurality of fifth through holes 5A have the same configuration, for example. The hole axis of each fifth through hole 5A extends in up-down direction C, for example. The planar shape of fifth through hole 5A in up-down direction C may be any shape having the long-side direction extending in second direction B and the short-side direction extending in first direction A, and may be an approximately elliptical shape, for example.

As shown in FIGS. 6 and 7, the inner diameter of fifth through hole 5A in second direction B is longer than the inner diameter of each of first through holes 1A in second direction B, and shorter than the length of heat transfer tube 200 in second direction B. The inner diameter of fifth through hole 5A in first direction A is approximately equal to the inner diameter of first through hole 1A in first direction A, for example. The hole axis of fifth through hole 5A is in parallel to the hole axis of first through hole 1A, for example.

As shown in FIGS. 6 and 7, seventh member 7 is formed as an outer member of distributor 101, and configured to have an upper surface 101A of distributor 101. Upper surface 101A is a main surface of seventh member 7 that is located on the opposite side of one main surface facing the plurality of fifth through holes 5A. Upper surface 101A of seventh member 7 is provided with a plurality of third through holes 7A spaced apart from each other in first direction A. Each of the plurality of third through holes 7A faces second space S2 through fifth through hole 5A. The plurality of third through holes 7A have the same configuration, for example. The hole axis of each third through hole 7A extends in up-down direction C. The planar shape of third through hole 7A as seen in up-down direction C has a long-side direction and a short-side direction, for example. The long-side direction of third through hole 7A extends in second direction B. The inner diameter of third through hole 7A in second direction B is longer than the length of heat transfer tube 200 in second direction B. In other words, the inner diameter of third through hole 7A in second direction B is longer than the inner diameter of fifth through hole 5A in second direction B. When distributor 100 is seen in up-down direction C, the opening end of each of the plurality of third through holes 7A is disposed on the outside of the opening end of each of the plurality of fifth through holes 5A.

As shown in FIG. 6, seventh member 7 serves to caulk first member 1, second member 2, third member 3, and fifth member 5. Seventh member 7 has a caulking portion 71 formed by bending a plate-shaped member. Caulking portion 71 is bent so as to face, in up-down direction C, the portion having upper surface 101A and provided with a plurality of third through holes 7A. Caulking portion 71 is disposed so as to face each other in second direction B with the bent portion of second member 2 interposed therebetween. Caulking portion 71 is in contact with the lower main surface of second member 2.

As shown in FIG. 6, the lower end of each of the plurality of heat transfer tubes 200 is introduced into each of the plurality of third through holes 7A to be in contact with a part of the upper main surface of fifth member 5. At this time, the plurality of refrigerant paths in each of the plurality of heat transfer tubes 200 face second space S2 through fifth through hole 5A, and are not covered by fifth member 5.

As shown in FIG. 6, first space S1 is provided inside groove 2A. First space S1 extends in first direction A. Second space S2 is provided inside second through hole 3A of third member 3. Third space S3 is provided inside each of the plurality of first through holes 1A. First space S1 and second space S2 are connected to each other through third space S3. In other words, first member 1 provides a partition between first space S1 and second space S2. Third space S3 is higher in flow path resistance than first space S1 and second space S2.

As shown in FIG. 6, in distributor 101, third space S3 is disposed on the opposite side of the plurality of third through holes 7A with respect to second space S2. Distributor 101 is provided therein with a refrigerant path extending upward sequentially through first space S1, third space S3, second space S2, and the plurality of third through holes 7A to each of the plurality of heat transfer tubes 200.

<Functions and Effects>

Since distributor 101 has basically the same configuration as that of distributor 100, it can achieve the same functions and effects as those of distributor 100 described above.

Furthermore, in distributor 101, the length of second space S2 in second direction B can be shorter than that in distributor 100, and can be reduced to the half of the length of second space S2 in second direction B in distributor 100, for example. As a result, the volume of the refrigerant path inside distributor 101 can be set at approximately 20% of the volume of the refrigerant path inside the conventional two-phase side horizontal distributor formed of a circular tube extending in the first direction, for example (see FIGS. 34 (A) and 34 (C)).

Distributor 101 according to the second embodiment does not have to include fifth member 5 as long as second space S2 can be maintained. In this case, seventh member 7 of distributor 101 only has to be fixed to the plurality of heat transfer tubes 200 by an optional method. Even distributor 101 as described above can achieve the same effect as that of distributor 101 described above.

Third Embodiment

<Configuration of Distributor>

Then, a distributor 102 according to the third embodiment will be described with reference to FIGS. 8 and 9. Distributor 102 according to the third embodiment has basically the same configuration as those of distributors 100 and 101 according to the first and second embodiments, but is different therefrom in the following points. Specifically, the third direction extending from first space S1 through third space S3 to second space S2 extends in second direction B, and the fourth direction extending from second space S2 to third through hole 7A is directed from top to bottom.

Figure 8:
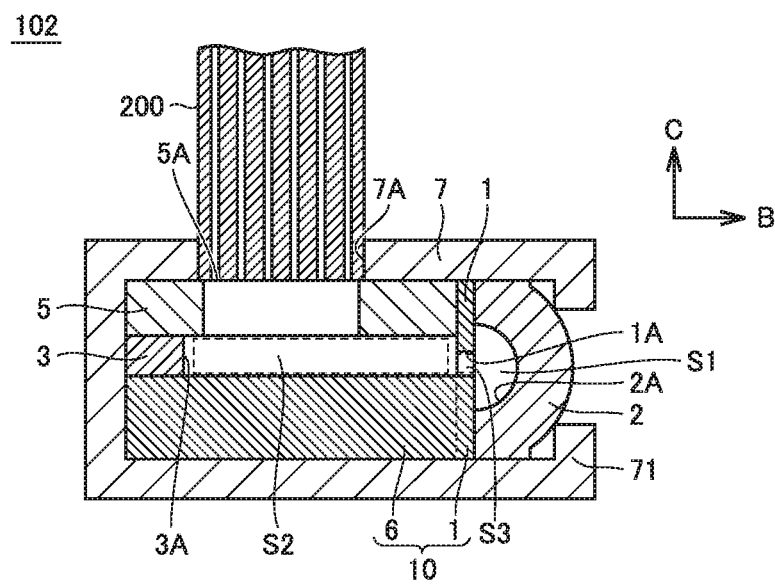
FIG. 8 is a cross-sectional view of a distributor according to the third embodiment, which is perpendicular to the first direction.
Figure 9:
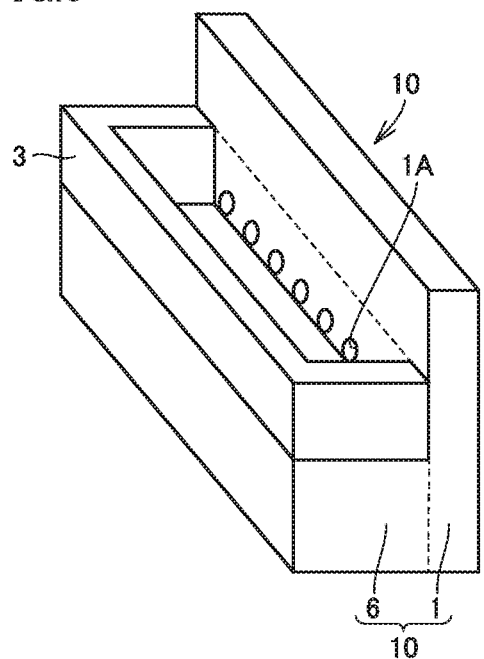
FIG. 9 is a perspective view of the first member and the third member of the distributor shown in FIG. 8.

As shown in FIGS. 8 and 9, distributor 102 includes a second member 2, a third member 3, a fifth member 5, a seventh member 7, and a tenth member 10. Second member 2, third member 3, fifth member 5, seventh member 7, and tenth member 10 each are formed of a plate-shaped member, for example. When second member 2, fifth member 5, seventh member 7, and tenth member 10 are seen in up-down direction C, the outline shape of each member has a rectangular shape, for example, having a long-side direction extending in first direction A.

The cross-sectional shape of tenth member 10 that is perpendicular to first direction A is an L-shape, for example. Tenth member 10 is formed by bending a plate-shaped member, for example. Tenth member 10 includes a first member 1 and a sixth member 6. The long-side direction of first member 1 in the cross section perpendicular to first direction A extends in up-down direction C. The long-side direction of sixth member 6 in the cross section perpendicular to first direction A extends in second direction B.

First member 1 has basically the same configuration as that of first member 1 in each of distributors 100 and 101, but is different therefrom in the following points. Specifically, first member 1 is provided with the plurality of first through holes 1A having hole axes extending in second direction B, and is formed integrally with sixth member 6. The plurality of first through holes 1A are spaced apart from each other in first direction A. The plurality of first through holes 1A are provided above sixth member 6. In the cross section perpendicular to first direction A, the lower ends of the plurality of first through holes 1A are located on the same straight line as the upper surface of sixth member 6, for example. The upper surface of sixth member 6 faces a second through hole 3A of third member 3, a fifth through hole 5A of fifth member 5, and a third through hole 7A of seventh member 7, each of which will be described later.

Second member 2 has basically the same configuration as that of second member 2 in each of distributors 100 and 101, but is different therefrom in that the opening end of groove 2A is directed in second direction B. Groove 2A faces the plurality of first through holes 1A. Groove 2A extends in first direction A.

Third member 3 has basically the same configuration as that of third member 3 in each of distributors 100 and 101, but is different therefrom in that the outline shape of third member 3 has a C-shape when third member 3 is seen in up-down direction C. In a different point of view, second through hole 3A is opened to one end face of third member 3 in second direction B. Second through hole 3A has an inner circumferential surface extending in first direction A. This inner circumferential surface is disposed so as to face the plurality of first through holes 1A in second direction B.

Fifth member 5 has basically the same configuration as that of fifth member 5 in each of distributors 100 and 101. The plurality of fifth through holes 5A face second through hole 3A.

Seventh member 7 has basically the same configuration as that of seventh member 7 in distributor 101, but is different therefrom in that caulking portion 71 is disposed to face each other with the bent portion of second member 2 interposed therebetween in up-down direction C. As shown in FIG. 8, seventh member 7 serves to caulk tenth member 10, second member 2, third member 3, and fifth member 5.

As shown in FIG. 8, a first space S1 is provided inside groove 2A. First space S1 extends in first direction A. A second space S2 is provided inside second through hole 3A of third member 3. A third space S3 is provided inside each of the plurality of first through holes 1A. First space S1 and second space S2 are connected to each other through third space S3. In other words, first member 1 provides a partition between first space S1 and second space S2. Third space S3 is higher in flow path resistance than first space S1 and second space S2.

As shown in FIG. 8, in distributor 102, the third direction from first space S1 through third space S3 to second space S2 extends in second direction B while the fourth direction from second space S2 to third through hole 7A is directed downward.

Distributor 102 is provided therein with: a refrigerant path extending in second direction B from first space S1 through third space S3 to second space S2; and on the downstream side of the refrigerant path, a refrigerant path extending from second space S2 through the plurality of third through holes 7A to each of the plurality of heat transfer tubes 200.

<Functions and Effects>

Since distributor 102 has the basically the same configuration as that of distributor 100, it can achieve the same functions and effects as those of distributor 100 described above.

Furthermore, distributor 102 can be reduced in length of second space S2 in second direction B so as to be shorter than that of distributor 100. Consequently, the volume of the refrigerant path inside distributor 101 can be set to be 40% or less of the volume of the refrigerant path inside the conventional horizontal distributor formed of a circular tube extending in the first direction, for example.

Furthermore, in distributor 102, the circulation direction of the refrigerant can be changed in second space S2, as in distributor 100. Thus, distributor 102 can facilitate spreading of the gas-liquid two-phase refrigerant inside second space S2, thereby allowing more uniform distribution of the gas-liquid two-phase refrigerant to each of the plurality of heat transfer tubes 200.

In distributors 100 and 102, third member 3 may be provided with a second groove in place of second through hole 3A while second space S2 may be disposed inside the groove. The second groove only has to have basically the same configuration as that of second through hole 3A described above. The inner diameter of the second groove in second direction B is longer than the total sum of the inner diameter of first through hole 1A in second direction B and the inner diameter of fourth through hole 1B in second direction B. In distributor 100 including third member 3 as describe above, third member 3 is disposed such that the opening end of the second groove is directed upward, thereby allowing elimination of fourth member 4. Furthermore, in distributor 102 including third member 3 described above, third member 3 is disposed such that the opening end of the second groove is directed upward, thereby allowing elimination of sixth member 6. In other words, in each of distributors 100 and 102, the second groove provided in third member 3 may be formed as second through hole 3A extending to the main surface located on the opposite side of the above-mentioned main surface or may be formed as a groove obtained by providing a bottom portion inside third member 3.

In each of distributors 100, 101 and 102, at least some of first member 1, second member 2, third member 3, fourth member 4, fifth member 5, sixth member 6, and seventh member 7 may be integrated with each other. For example, third member 3 in distributor 100 may be integrated with fourth member 4. For example, first member 1 in distributor 102 may be integrated with fifth member 5 or third member 3.

Fourth Embodiment

<Configuration of Distributor>

Then, referring to FIGS. 10 and 11, the distributor according to the fourth embodiment will be hereinafter described. The distributor according to the fourth embodiment has basically the same configuration as that of distributor 100 according to the first embodiment, but is different therefrom in that third member 3 is provided with a plurality of second through holes 3A (recess portions) that are spaced apart from each other in first direction A.

Figure 10:
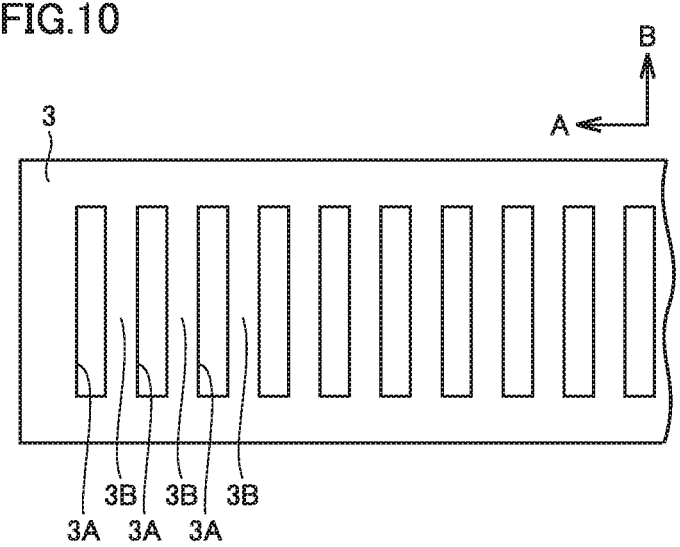
FIG. 10 is a plan view of the third member of a distributor according to the fourth embodiment.
Figure 11:
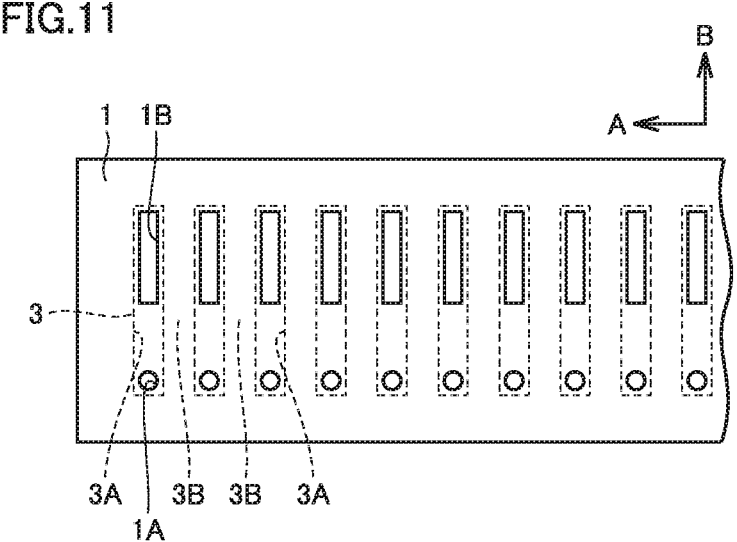
FIG. 11 is a plan view showing the positional relation between: a plurality of first through holes and a plurality of fourth through holes in the first member; and a plurality of second through holes in the third member, in the distributor according to the fourth embodiment.

As shown in FIGS. 10 and 11, a portion 3B extending in second direction B is disposed between the plurality of second through holes 3A. The plurality of second through holes 3A have the same configuration, for example. One second through hole 3A faces one first through hole 1A and one fourth through hole 1B, for example. One second space S2 is disposed inside each of the plurality of second through holes 3A.

The planar shape of second through hole 3A as seen in up-down direction C is a rectangular shape, for example. The inner diameter of second through hole 3A in first direction A is shorter than the inner diameter of second through hole 3A in second direction B. The inner diameter of second through hole 3A in first direction A is longer than the inner diameter of first through hole 1A in first direction A and than the inner diameter of fourth through hole 1B in first direction A. The inner diameter of second through hole 3A in second direction B is longer than the total sum of the inner diameter of first through hole 1A in second direction B and the inner diameter of fourth through hole 1B in second direction B. In other words, in the distributor according to the fourth embodiment, third member 3 of distributor 100 is replaced with third member 3 provided with a plurality of second through holes 3A.

<Functions and Effects>

Also in this way, the inner diameter of second through hole 3A in first direction A is longer than the inner diameter of first through hole 1A in first direction A and than the inner diameter of fourth through hole 1B in first direction A. Thus, refrigerant can spread in second direction B inside each second space S2. As a result, the distributor according to the fourth embodiment can uniformly distribute gas-liquid two-phase refrigerant to each of the plurality of refrigerant paths spaced apart from each other in second direction B inside each heat transfer tube 200 introduced into each of the plurality of third through holes 7A.

Furthermore, the distributor according to the fourth embodiment can be reduced in volume of second space S2 as compared with distributor 100.

<Modifications>

The distributor according to the fourth embodiment has basically the same configuration as that of the distributor in the second or third embodiment, and may be different therefrom in that third member 3 is provided with a plurality of second through holes 3A (recess portions) that are spaced apart from each other in first direction A.

Figure 12:
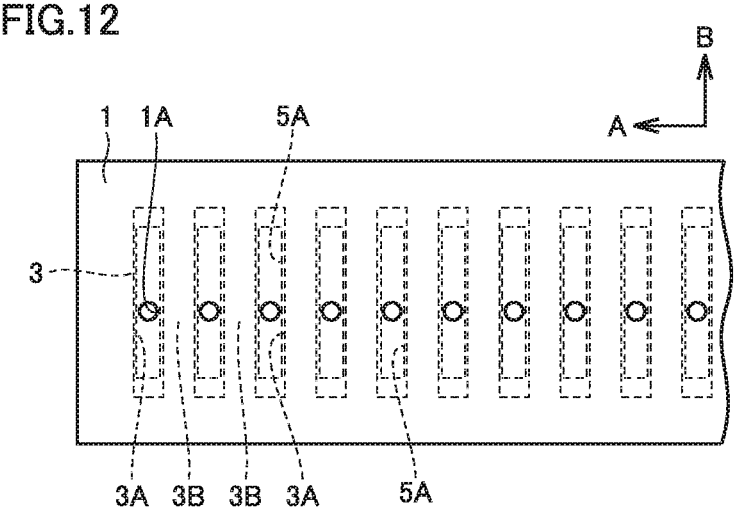
FIG. 12 is a plan view showing the positional relation between the plurality of first through holes in the first member and the plurality of second through holes in the third member, in a modification of the distributor according to the fourth embodiment.

As shown in FIG. 12, each of the plurality of second through holes 3A may face one first through hole 1A and one fifth through hole 5A. In other words, the distributor according to the fourth embodiment may be configured such that third member 3 of distributor 101 is replaced with third member 3 provided with a plurality of second through holes 3A. The inner diameter of second through hole 3A in first direction A is longer than the inner diameter of first through hole 1A in first direction A and than the inner diameter of fifth through hole 5A in first direction A. The inner diameter of second through hole 3A in second direction B is longer than the inner diameter of first through hole 1A in second direction B and than the inner diameter of fourth through hole 1B in second direction B. The distributor according to the fourth embodiment as described above can be reduced in volume of second space S2 as compared with distributor 101.

Figure 13:
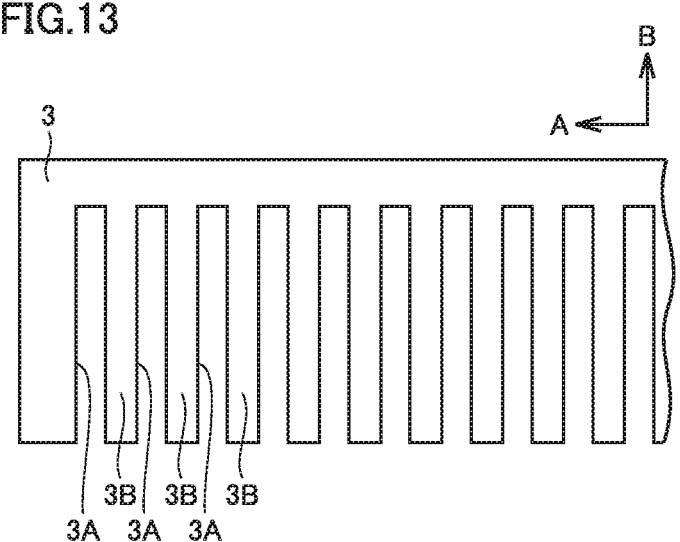
FIG. 13 is a plan view showing a modification of the third member of the distributor according to the fourth embodiment.

As shown in FIG. 13, each of the plurality of second through holes 3A may be opened to one end face of third member 3 in second direction B. In other words, the distributor according to the fourth embodiment may be configured such that third member 3 of distributor 102 is replaced with third member 3 provided with a plurality of second through holes 3A. The outline shape of third member 3 is a comb shape, for example, in a top view of third member 3 in up-down direction C. Each of the plurality of second through holes 3A has an inner circumferential surface extending in first direction A. Each of the inner circumferential surfaces is disposed to face each of the plurality of first through holes 1A in second direction B. The distributor according to the fourth embodiment as described above can be reduced in volume of second space S2 as compared with distributor 102.

Fifth Embodiment

<Configuration of Distributor>

Figure 14:
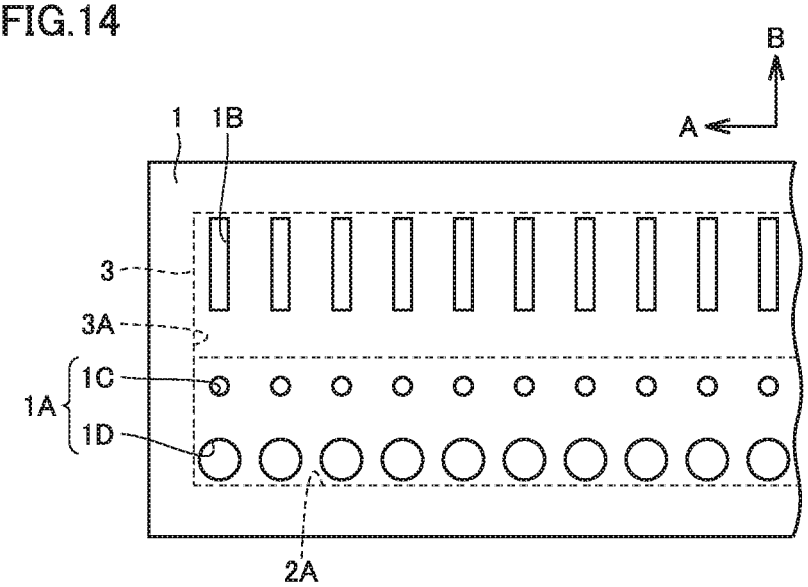
FIG. 14 is a plan view of the first member of a distributor according to the fifth embodiment.
Figure 15:
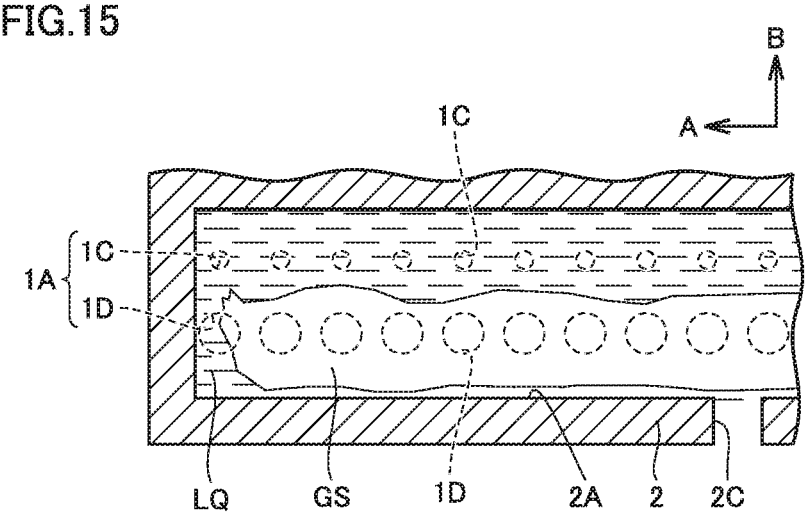
FIG. 15 is a plan view showing an example of distribution of gas-liquid two-phase refrigerant flowing through a groove in the second member of the distributor according to the fifth embodiment.

Then, the distributor according to the fifth embodiment will be described with reference to FIGS. 14 and 15. The distributor according to the fifth embodiment has basically the same configuration as that of distributor 100 according to the first embodiment, but is different therefrom in that a plurality of first through holes 1A include a first group of first through holes 1C and a second group of first through holes 1D disposed such that the first group of first through holes 1C is spaced apart from the second group of first through holes 1D in first direction A. In FIG. 14, a second through hole 3A of third member 3 disposed to overlap with first member 1 in up-down direction C is shown by a dotted line.

As shown in FIG. 14, each of first through holes 1C in the first group of first through holes 1C is spaced apart from each of first through holes 1D in the second group of first through holes 1D in second direction B. First through holes 1C in the first group of first through holes 1C have the same configuration, for example. First through holes 1D in the second group of first through holes 1D have the same configuration, for example. The opening area of each of first through holes 1C in the first group of first through holes 1C is smaller than the opening area of each of first through holes 1D in the second group of first through holes 1D. The opening area of each of first through holes 1C in the first group of first through holes 1C is 10% or more and 50% or less of the opening area of each of first through holes 1D in the second group of first through holes 1D, for example. The planar shape of each of first through holes 1C and 1D as seen in up-down direction C is a circular shape, for example.

As shown in FIG. 14, each of first through holes 1C in the first group of first through holes 1C is spaced apart from each of the plurality of fourth through holes 1B in the direction crossing: first direction A; and the extending direction of the hole axis of each first through hole 1C. Each of first through holes 1C in the first group of first through holes 1C is spaced apart from each of the plurality of fourth through holes 1B in second direction B. The first group of first through holes 1C is provided in first member 1 between the second group of first through holes 1D and each of the plurality of fourth through holes 1B, for example.

Third space S3 is provided inside each of: first through holes 1C in the first group of first through holes 1C; and first through holes 1D in the second group of first through holes 1D. The flow path resistance in third space S3 inside each of first through holes 1C in the first group of first through holes 1C and the flow path resistance in third space S3 inside each of first through holes 1D in the second group of first through holes 1D are higher than the flow path resistance in first space S1 and the flow path resistance in second space S2. The flow path resistance in third space S3 inside each of first through holes 1C in the first group of first through holes 1C is higher than the flow path resistance in third space S3 inside each of first through holes 1D in the second group of first through holes 1D.

An inflow portion through which refrigerant is introduced into first space S1 is connected, for example, to the center portion of groove 2A of second member 2 in first direction A. As shown in FIG. 15, a connection hole 2C for connecting the inflow portion is formed in the center portion of second member 2 in first direction A.

Connection hole 2C faces first space S1 inside groove 2A. In the distributor according to the fifth embodiment, refrigerant flows through first space S1 from the center portion in first direction A to the outside. Connection hole 2C is located closer to the second group of first through holes 1D than to the first group of first through holes 1C, for example.

<Functions and Effects>

The gas-liquid two-phase refrigerant flowing from first space S1 through one of the plurality of first through holes 1A into second space S2 flows through first space S1 in first direction A to thereby undergo pressure loss and also flows through first through hole 1A to thereby undergo pressure loss. In distributor 100 provided with the plurality of first through holes 1A having equally small opening areas, pressure loss is more likely to occur in the refrigerant path extending through first through hole 1A farther away from the inflow portion. The gas-phase refrigerant in the gas-liquid two-phase refrigerant is more likely to flow through a path that is less likely to undergo pressure loss as compared with the liquid-phase refrigerant. Accordingly, the gas-phase refrigerant flowing into first space S1 extending in first direction A is more likely to flow through the refrigerant path extending through first through hole 1A close to the inflow portion. On the other hand, the liquid-phase refrigerant flowing into first space S1 extending in first direction A may flow through first space S1 to the region located at a distant from the inflow portion. Thus, in distributor 100, the proportion of the gas-phase refrigerant in the gas-liquid two-phase refrigerant flowing through first through hole 1A that is relatively distant from the inflow portion in first direction A may be smaller than the proportion of the gas-phase refrigerant in the gas-liquid two-phase refrigerant flowing through first through hole 1A that is relatively close to the inflow portion in first direction A.

In contrast, according to the distributor in the fifth embodiment, the opening area of each of first through holes 1D in the second group of first through holes 1D is larger than the opening area of each of first through holes 1C in the first group of first through holes 1C. Accordingly, the gas-phase refrigerant in the gas-liquid two-phase refrigerant is more likely to flow through the space, which is closer to the second group of first through holes 1D than to the first group of first through holes 1C in first space S1, to the region where the inflow portion is at a distant from connection hole 2C. In other words, according to the distributor in the fifth embodiment, the gas-phase refrigerant can be caused to flow farther away from connection hole 2C in first space S1 as compared with distributor 100. As a result, the amount of the liquid-phase refrigerant emitted from third space S3 into second space S2 inside the first group of first through holes 1C and the amount of the gas-phase refrigerant emitted from third space S3 into second space S2 inside the second group of first through holes 1D can be further equalized in first direction A. Thereby, the gas-liquid two-phase refrigerant mixed in second space S2 is further equalized in first direction A. Thus, the distributor according to the fifth embodiment can distribute the gas-liquid two-phase refrigerant more equally in first direction A.

<Modifications>

The distributor according to the fifth embodiment has basically the same configuration as that of one of the distributors according to the second to fourth embodiments, but may be different therefrom in that the plurality of first through holes 1A include the first group of first through holes 1C and the second group of first through holes 1D that are spaced apart from each other in first direction A. First member 1 in the distributor according to the fifth embodiment may have basically the same configuration as that of first member 1 in distributor 102. In this case, each of first through holes 1C in the first group of first through holes 1C is spaced apart from each of first through holes 1D in the second group of first through holes 1D in up-down direction C crossing each of first direction A and second direction B that corresponds to the extending direction of the hole axis of each first through hole 1C. Each of first through holes 1C in the first group of first through holes 1C is disposed below each of first through holes 1D in the second group of first through holes 1D, for example.

Figure 16:
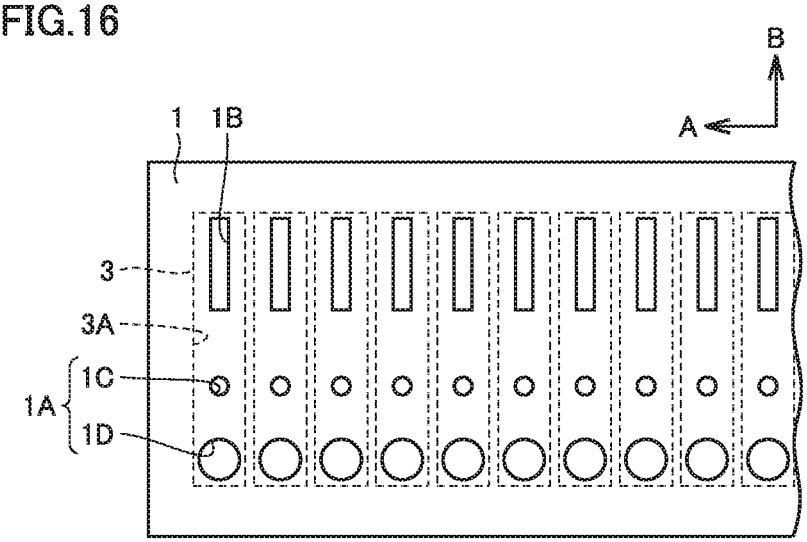
FIG. 16 is a plan view of the first member of a modification of the distributor according to the fifth embodiment.

Furthermore, as shown in FIG. 16, each of the first group of first through holes 1C and the second group of first through holes 1D may be disposed to face each of the plurality of second through holes 3A. In FIG. 16, the plurality of second through holes 3A in third member 3 disposed to overlap with first member 1 in up-down direction C are shown by a dotted line. One first through hole 1C and one first through hole 1D may be disposed inside one second through hole 3A. The distributor according to the fifth embodiment having the configuration as described above can further achieve the same effect as that of the distributor according to the fourth embodiment.

Furthermore, the inflow portion through which refrigerant flows into first space S1 may be connected to one end of groove 2A of second member 2 in first direction A, for example. Also in this way, according to the distributor in the fifth embodiment, the gas-phase refrigerant in the gas-liquid two-phase refrigerant can be caused to flow to the other end of first space S1 in first direction A to which the inflow portion is not connected. Thus, the gas-liquid two-phase refrigerant can be more uniformly distributed in first direction A.

Sixth Embodiment

<Configuration of Distributor>

Figure 17:
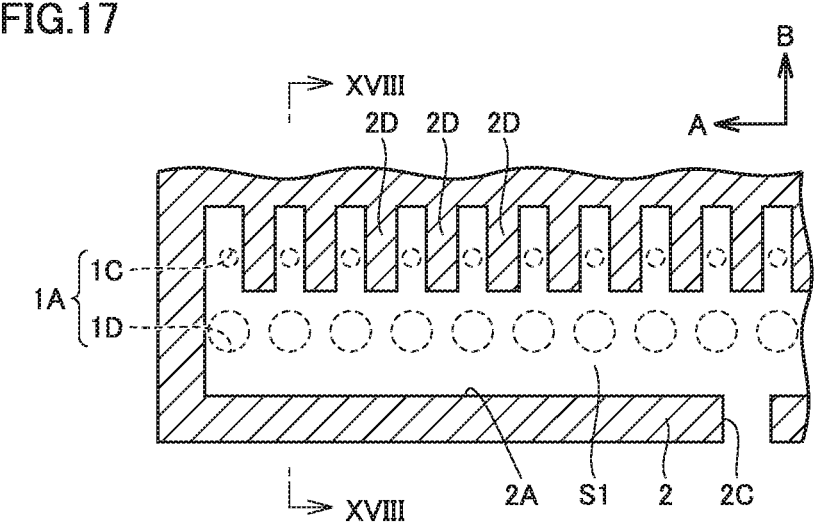
FIG. 17 is a cross-sectional view of the second member of a distributor according to the sixth embodiment, which is perpendicular to an up-down direction.

Then, the distributor according to the sixth embodiment will be described with reference to FIGS. 17 and 18. The distributor according to the sixth embodiment has basically the same configuration as that of the distributor according to the fifth embodiment, but is different therefrom in that it further includes a plurality of partition members 2D disposed inside first space S1 to be spaced apart from each other in first direction A. FIG. 17 is a cross-sectional view of second member 2 of the distributor according to the sixth embodiment, which is perpendicular to up-down direction C. In FIG. 17, a plurality of first through holes 1A in first member 1 disposed to overlap with second member 2 in up-down direction C are shown by a dotted line.

As shown in FIG. 17, each of the plurality of partition members 2D is disposed between first through holes 1C in the first group of first through holes 1C as seen from first space S1. Each of the plurality of first through holes 1C faces each space located between the plurality of partition members 2D in first space S1. The plurality of partition members 2D have the same configuration, for example. The cross-sectional shape of each of the plurality of partition members 2D that is perpendicular to up-down direction C may be any shape having a long-side direction extending in second direction B and a short-side direction extending in first direction A, and may be a rectangular shape, for example. The plurality of partition members 2D are formed to be integrated with second member 2, for example.

Figure 18:
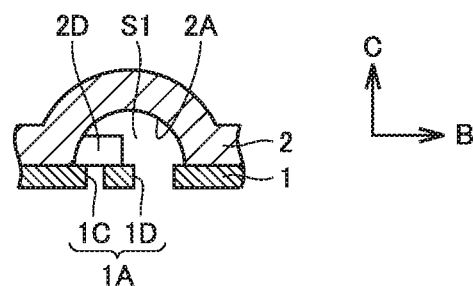
FIG. 18 is an partial cross-sectional view of the first member and the second member of the distributor according to the sixth embodiment, which is perpendicular to the first direction.

As shown in FIG. 18, partition member 2D is in contact with the surface of first member 1 that faces groove 2A, for example. In a different point of view, partition member 2D has a surface that is continuous to the above-mentioned main surface of second member 2 that faces the plurality of first through holes 1A. Partition member 2D has a surface that is located on the opposite side of the surface in contact with first member 1 and that faces the inner surface of groove 2A, for example. In a different point of view, the above-mentioned space located between the plurality of partition members 2D in first space S1 is connected to another space that is not located between the plurality of partition members 2D in first space S1 in second direction B and up-down direction C.

<Functions and Effects>

According to the distributor in the sixth embodiment, liquid-phase refrigerant is more likely to accumulate in the above-mentioned space located between the plurality of partition members 2D in first space S1. The space faces the first group of first through holes 1C. Accordingly, in the distributor according to the sixth embodiment, the liquid-phase refrigerant is more likely to flow through the first group of first through holes 1C as compared with the distributor not including partition member 2D. Furthermore, pressure loss is more likely to occur in the above-mentioned space as compared with another region in first space S1. Thus, in the distributor according to the sixth embodiment, the gas-phase refrigerant is more likely to flow through the second group of first through holes 1D as compared with the distributor not including partition member 2D. As a result, according to the distributor in the sixth embodiment, the gas-liquid two-phase refrigerant can be distributed more uniformly as compared with the distributor not including partition member 2D.

Seventh Embodiment

<Configuration of Distributor>

Then, the distributor according to the seventh embodiment will be described with reference to FIG. 19. The distributor according to the seventh embodiment has basically the same configuration as that of distributor 100 according to the first embodiment, but is different therefrom in that at least one end of first space S1 in first direction A has a semicircular cross-sectional shape perpendicular to up-down direction C.

At each of both ends of groove 2A of second member 2 in first direction A, the cross-sectional shape perpendicular to up-down direction C is a semicircular shape, for example. First space S1 is provided inside groove 2A, and therefore, has both ends in first direction A each having a semicircular cross-sectional shape perpendicular to up-down direction C.

Figure 19:
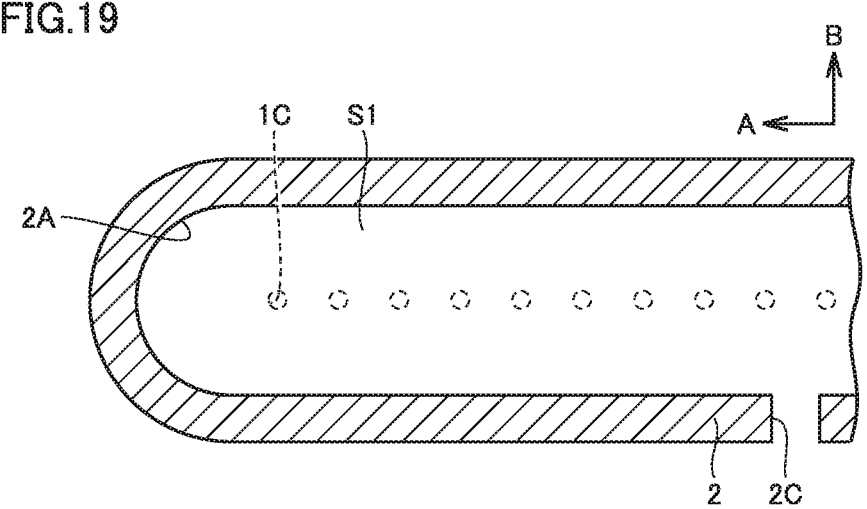
FIG. 19 is a cross-sectional view of the second member of a distributor according to the seventh embodiment, which is perpendicular to the up-down direction.

As shown in FIG. 19, a connection hole 2C to which an inflow portion is to be connected is provided in the center portion of second member 2 in first direction A. Connection hole 2C faces first space S1 inside groove 2A. In this case, refrigerant flows through first space S1 from the center portion in first direction A to the outside.

<Functions and Effects>

Due to the surface tension of the liquid-phase refrigerant in the gas-liquid two-phase refrigerant, the liquid-phase refrigerant flows through first space S1 along the inner surface of groove 2A. Thus, according to the distributor in the seventh embodiment, the liquid-phase refrigerant is less likely to accumulate at both ends of first space S1 in first direction A, as compared with the case where the cross-sectional shape of first space S1 perpendicular to up-down direction C is a rectangular shape. Consequently, the distributor according to the seventh embodiment can distribute the gas-liquid two-phase refrigerant more uniformly in first direction A.

<Modifications>

The distributor according to the seventh embodiment has basically the same configuration as that of any one of the distributors according to the second to sixth embodiments, but may be different therefrom in that at least one of ends of first space S1 in first direction A has a semicircular cross-sectional shape perpendicular to up-down direction C.

A plurality of first through holes 1A in the distributor according to the seventh embodiment may include a first group of first through holes 1C and a second group of first through holes 1D as in the distributor according to the fifth embodiment.

Eighth Embodiment

<Configuration of Distributor>

Figure 20:
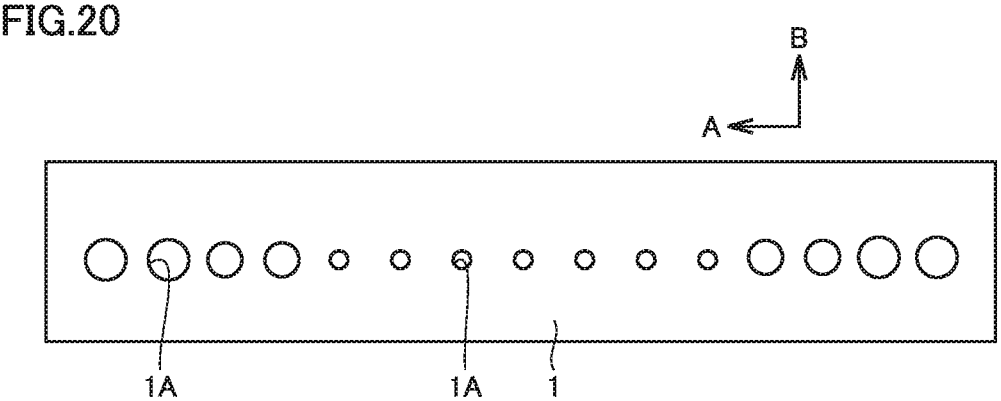
FIG. 20 is a plan view of the first member of a distributor according to the eighth embodiment.

Then, the distributor according to the eighth embodiment will be described with reference to FIG. 20. The distributor according to the eighth embodiment has basically the same configuration as that of the distributor according to the first embodiment, but is different therefrom in that the opening area of first through hole 1A among the plurality of first through holes 1A that is relatively far away from the inflow portion in first direction A is smaller than the opening area of first through hole 1A among the plurality of first through holes 1A that is relatively close to the inflow portion. FIG. 20 is a plan view showing first member 1 according to the eighth embodiment as seen in up-down direction C. In FIG. 20, the portion overlapping with inflow portion 8 in up-down direction C is shown by an arrow.

The opening areas of the plurality of first through holes 1A change gradually according to their positions in first direction A, for example.

<Functions and Effects>

As described above, the gas-liquid two-phase refrigerant flowing from first space S1 through any one of the plurality of first through holes 1A into second space S2 flows through first space S1 in first direction A to thereby undergo pressure loss, and also flows through first through hole 1A to thereby undergo pressure loss. In the distributor according to the eighth embodiment, the pressure loss caused due to flowing through first space S1 in first direction A is greater as first through hole 1A is located farther away from the inflow portion, whereas the pressure loss caused due to flowing through first through hole 1A is smaller as first through hole 1A is located farther away from the inflow portion. Thus, according to the distributor in the eighth embodiment, the pressure loss in each of the plurality of refrigerant paths extending from first space S1 through any one of the plurality of first through holes 1A into second space S2 can be equalized irrespective of the positions of the corresponding first through holes 1A in first direction A. Accordingly, the gas-phase refrigerant in the gas-liquid two-phase refrigerant can be distributed more uniformly inside the plurality of first through holes 1A in first direction A. Consequently, according to the distributor in the eighth embodiment, the gas-liquid two-phase refrigerant can be distributed more uniformly in first direction A.

<Modifications>

The distributor according to the eighth embodiment has basically the same configuration as that of any one of the distributors according to the second to seventh embodiments, but may be different therefrom in that the opening area of first through hole 1A among the plurality of first through holes 1A that is located relatively far away from the inflow portion in first direction A is smaller than the opening area of first through hole 1A among the plurality of first through holes 1A that is located relatively close to this inflow portion. The distributor according to the eighth embodiment may include a first group of first through holes 1C and a second group of first through holes 1D as in the distributor according to the fifth embodiment, for example. In at least one of the first group of first through holes 1C and the second group of first through holes 1D, the opening areas of first through holes 1C and 1D that are relatively far away from the inflow portion in first direction A are smaller than the opening areas of first through holes 1C and 1D, respectively, that are relatively close to this inflow portion.

Ninth Embodiment

<Configuration of Distributor>

Figure 21:
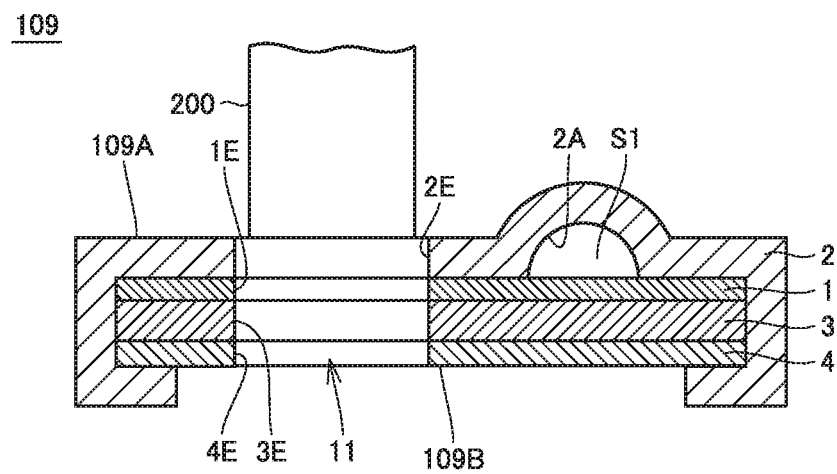
FIG. 21 is a cross-sectional view of a distributor according to the ninth embodiment, which is perpendicular to the first direction.

Then, the distributor according to the ninth embodiment will be described with reference to FIGS. 21 to 25. A distributor 109 according to the ninth embodiment has basically the same configuration as that of the distributor according to the fourth embodiment, but is different therefrom in that it includes a bottom surface 109B located on the opposite side of upper surface 109A, and is provided with a drainage channel hole 11 extending from upper surface 109A to bottom surface 109B and not connected to each of first space S1, second space S2 and third space S3. FIG. 21 is a cross-sectional view of the portion provided with drainage channel hole 11 in distributor 109, which is perpendicular to first direction A.

As shown in FIGS. 21 and 22, upper surface 109A is a main surface of second member 2 that is located on the opposite side of the main surface facing first member 1. Second member 2 is provided with: a plurality of third through holes 2B spaced apart from each other in first direction A; and a plurality of drainage channel holes 2E each located between the plurality of third through holes 2B. The plurality of drainage channel holes 2E are spaced apart from each other in first direction A. The plurality of drainage channel holes 2E are spaced apart from groove 2A in second direction B. The inner diameter of each of the plurality of drainage channel holes 2E in first direction A is shorter than the inner diameter of each of the plurality of third through holes 2B in first direction A, for example. The inner diameter of each of the plurality of drainage channel holes 2E in second direction B is longer than the inner diameter of each of the plurality of third through holes 2B in second direction B, for example.

As shown in FIGS. 21 and 23, first member 1 is provided with: a plurality of fourth through holes 1B spaced apart from each other in first direction A; and a plurality of drainage channel holes 1E each located between the plurality of fourth through holes 1B. In other words, the plurality of drainage channel holes 1E are disposed not side by side with the plurality of first through holes 1A in second direction B, and also not connected to third space S3 inside each of the plurality of first through holes 1A. The plurality of drainage channel holes 1E are spaced apart from each other in first direction A. The inner diameter of each of the plurality of drainage channel holes 1E in first direction A is shorter than the inner diameter of each of the plurality of fourth through holes 1B in first direction A, for example. The inner diameter of each of the plurality of drainage channel holes 1E in second direction B is longer than the inner diameter of each of the plurality of fourth through holes 1B in second direction B, for example.

Figure 24:
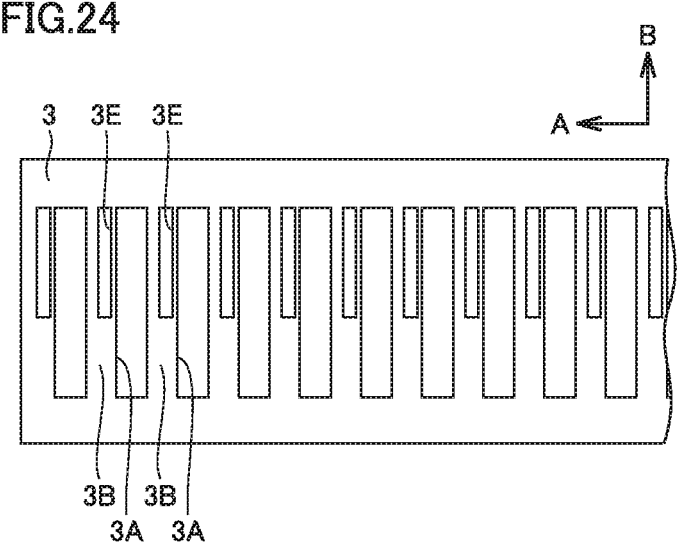
FIG. 24 is a plan view of the third member of the distributor according to the ninth embodiment.

As shown in FIGS. 21 and 24, third member 3 is provided with: a plurality of second through holes 3A spaced apart from each other in first direction A; and a plurality of drainage channel holes 3E each located between the plurality of second through holes 3A. In other words, the plurality of drainage channel holes 3E are disposed on a portion 3B located between the plurality of second through holes 3A and extending in second direction B, but not connected to second space S2 inside each of the plurality of second through holes 3A. The plurality of drainage channel holes 3E are spaced apart from each other in first direction A. The inner diameter of each of the plurality of drainage channel holes 3E in first direction A is shorter than the inner diameter of each of the plurality of second through holes 3A in first direction A, for example. The inner diameter of each of the plurality of drainage channel holes 3E in second direction B is shorter than the inner diameter of each of the plurality of second through holes 3A in second direction B, for example.

Figure 25:
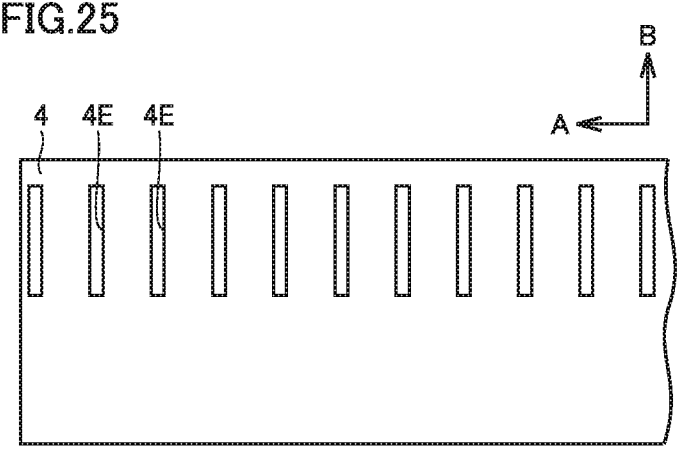
FIG. 25 is a plan view of the fourth member of the distributor according to the ninth embodiment.

As shown in FIGS. 21 and 25, bottom surface 109B is a main surface of fourth member 4 that is located on the opposite side of the main surface facing third member 3. Fourth member 4 is provided with a plurality of drainage channel holes 4E spaced apart from each other in first direction A.

As shown in FIGS. 21 to 25, the plurality of drainage channel holes 2E in second member 2, the plurality of drainage channel holes 1E in first member 1, the plurality of drainage channel holes 3E in third member 3, and the plurality of drainage channel holes 4E in fourth member 4 are disposed to be overlaid on one another in up-down direction C. The plurality of drainage channel holes 2E, the plurality of drainage channel holes 1E, the plurality of drainage channel holes 3E, and the plurality of drainage channel holes 4E are identical in planar shape as seen in up-down direction C, for example. The plurality of drainage channel holes 2E, the plurality of drainage channel holes 1E, the plurality of drainage channel holes 3E, and the plurality of drainage channel holes 4E are connected sequentially from top to bottom to form a plurality of drainage channel holes 11.

<Functions and Effects>

Distributor 109 according to the ninth embodiment is provided with a plurality of drainage channel holes 11 extending from upper surface 109A to bottom surface 109B between the plurality of third through holes 2B, into which the lower ends of the plurality of heat transfer tubes 200 are introduced. Thus, according to distributor 109, liquid such as water having flown through the plurality of heat transfer tubes 200 to upper surface 109A can be discharged through the plurality of drainage channel holes 11 to bottom surface 109B of distributor 109. Accordingly, in distributor 109, for example, when dew condensation water produced by the defrosting operation on the fins and heat transfer tubes 200 is discharged through each heat transfer tube 200 in the downward direction, accumulation of such dew condensation water on upper surface 109A is prevented. Consequently, the heat exchanger including distributor 109 can immediately discharge the dew condensation water produced during the defrosting operation in the downward direction. Thus, the heating operation can be performed with high efficiency while corrosion of distributor 109 due to accumulation of dew condensation water is suppressed.

In addition, since the plurality of drainage channel holes 11 are not connected to each of first space S1, second space S2 and third space S3. Thus, distributor 109 has the same refrigerant distribution performance as that of the distributor according to the fourth embodiment.

<Modifications>

The distributor according to the ninth embodiment has basically the same configuration as that of any one of the distributors according to the first to third and fifth to eighth embodiments, but may be different therefrom in that it has a bottom surface located on the opposite side of the upper surface and also includes a drainage channel hole extending from the upper surface to the bottom surface and not connected to each of first space S1, second space S2 and third space S3.

For example, in the distributor according to the ninth embodiment having the same configuration as that of distributor 100 according to the first embodiment, the drainage channel hole only has to be spaced apart from first through hole 1A, second through hole 3A, third through hole 2B and fourth through hole 1B in at least one of first direction A and second direction B.

For example, in the distributor according to the ninth embodiment having the same configuration as that of each of distributors 101 and 102 according to the second and third embodiment, the drainage channel hole only has to be spaced apart from first through hole 1A, groove 2A, second through hole 3A, third through hole 7A and fifth through hole 5A in at least one of first direction A and second direction B.

The inner circumferential surface of drainage channel hole 11 may be provided with protrusions and recesses. The top portion and the bottom portion in each of the protrusions and recesses extend in up-down direction C. In this way, the dew condensation water having flown into the plurality of drainage channel holes 11 can be more effectively discharged through these protrusions and recesses.

In the distributor according to the ninth embodiment, the plurality of drainage channel holes 11 may be spaced apart from each other in second direction B.

Tenth Embodiment

<Configuration of Distributor>

Figure 26:
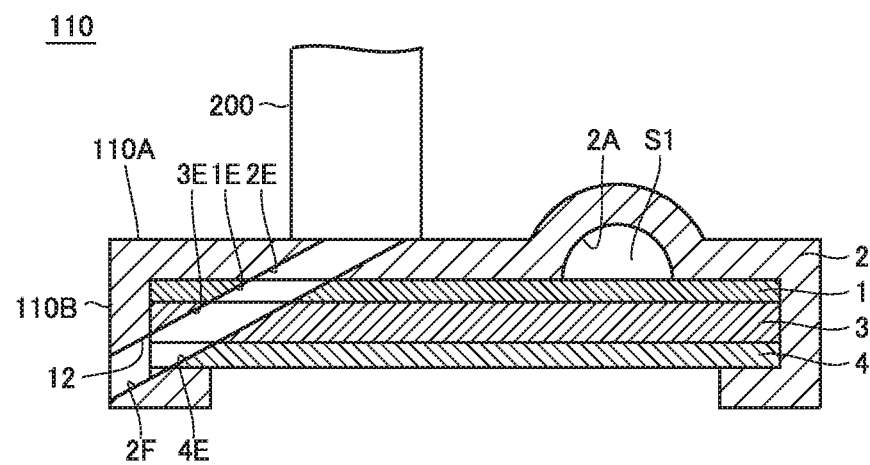
FIG. 26 is a cross-sectional view of a distributor according to the tenth embodiment, which is perpendicular to the first direction.

Then, the distributor according to the tenth embodiment will be described with reference to FIGS. 26 to 30. A distributor 110 according to the tenth embodiment has basically the same configuration as that of the distributor according to the fourth embodiment, but is different therefrom in that: second member 2 as an outer member further includes a side surface 110B extending in the direction crossing the above-described upper surface 110A; and a drainage channel hole 12 is provided that extends from upper surface 110A to side surface 110B and not connected to each of first space S1, second space S2 and third space S3. FIG. 26 is a cross-sectional view of a portion of distributor 110 that is provided with drainage channel hole 12, which is perpendicular to first direction A.

Figure 27:
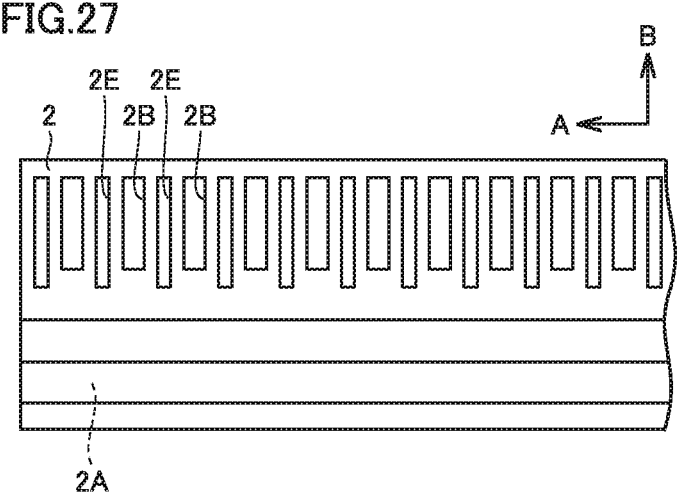
FIG. 27 is a plan view of the second member of the distributor according to the tenth embodiment.

As shown in FIGS. 26 and 27, upper surface 110A is a main surface of second member 2 that is located on the opposite side of the main surface facing first member 1. Second member 2 is provided with: a plurality of third through holes 2B spaced apart from each other in first direction A; and a plurality of drainage channel holes 2E each disposed between the plurality of third through holes 2B. The plurality of drainage channel holes 2E are spaced apart from each other in first direction A. The plurality of drainage channel holes 2E are spaced apart from groove 2A in second direction B. The inner diameter of each of the plurality of drainage channel holes 2E in first direction A is shorter than the inner diameter of each of the plurality of third through holes 2B in first direction A, for example. The inner diameter of each of the plurality of drainage channel holes 2E in second direction B is longer than the inner diameter of each of the plurality of third through holes 2B in second direction B, for example.

Figure 28:
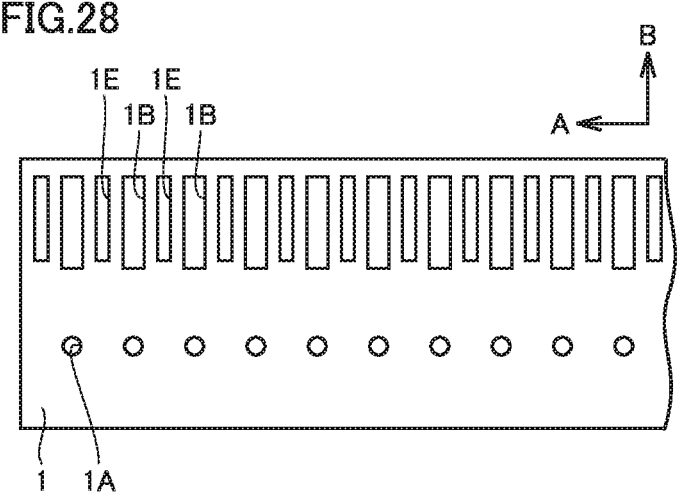
FIG. 28 is a plan view of the first member of the distributor according to the tenth embodiment.

As shown in FIGS. 26 and 28, first member 1 is provided with: a plurality of fourth through holes 1B spaced apart from each other in first direction A; and a plurality of drainage channel holes 1E each located between the plurality of fourth through holes 1B. In other words, the plurality of drainage channel holes 1E are arranged not side by side with the plurality of first through holes 1A in second direction B and also not connected to third space S3 inside each of the plurality of first through holes 1A. The plurality of drainage channel holes 1E are spaced apart from each other in first direction A. The inner diameter of each of the plurality of drainage channel holes 1E in first direction A is shorter than the inner diameter of each of the plurality of fourth through holes 1B in first direction A, for example. The inner diameter of each of the plurality of drainage channel holes 1E in second direction B is shorter than the inner diameter of each of the plurality of fourth through holes 1B in second direction B, for example.

Figure 29:
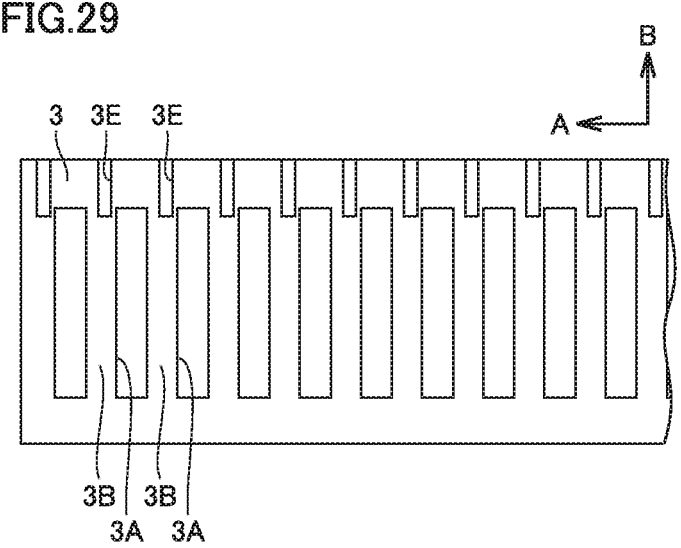
FIG. 29 is a plan view of the third member of the distributor according to the tenth embodiment.

As shown in FIGS. 26 and 29, third member 3 is provided with: a plurality of second through holes 3A spaced apart from each other in first direction A; and a plurality of drainage channel holes 3E spaced apart from each other in first direction A. A part of each of the plurality of drainage channel holes 3E is disposed between the plurality of second through holes 3A. The plurality of drainage channel holes 3E are not connected to second space S2 inside each of the plurality of second through holes 3A. The inner diameter of each of the plurality of drainage channel holes 3E in first direction A is shorter than the inner diameter of each of the plurality of second through holes 3A in first direction A, for example. The inner diameter of each of the plurality of drainage channel holes 3E in second direction B is shorter than the inner diameter of each of the plurality of second through holes 3A in second direction B, for example. Each of the plurality of drainage channel holes 3E is opened to one end face of third member 3 in second direction B, for example.

Figure 30:
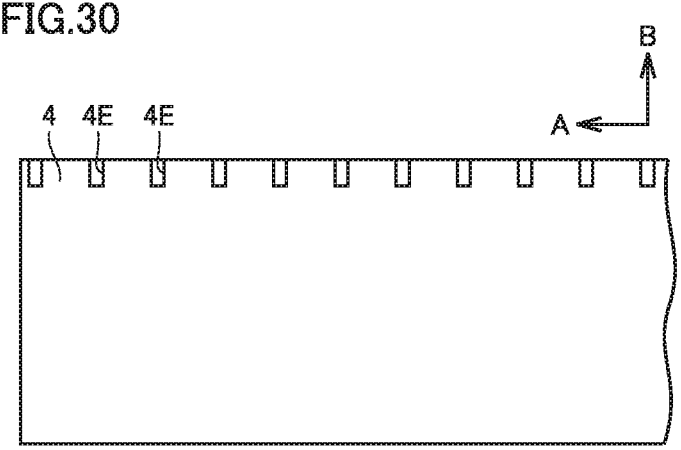
FIG. 30 is a plan view of the fourth member of the distributor according to the tenth embodiment.

As shown in FIGS. 26 and 30, fourth member 4 is provided with a plurality of drainage channel holes 4E spaced apart from each other in first direction A. Each of the plurality of drainage channel holes 4E is opened to one end face of fourth member 4 in second direction B, for example. Side surface 110B of distributor 110 is a surface of second member 2 that extends in up-down direction C. Side surface 110B of second member 2 is provided with a plurality of drainage channel holes 2F (see FIG. 26) spaced apart from each other in first direction A.

As shown in FIGS. 26 to 30, each of the plurality of drainage channel holes 2E in second member 2, each of the plurality of drainage channel holes 1E in first member 1, each of the plurality of drainage channel holes 3E in third member 3, each of the plurality of drainage channel holes 4E in fourth member 4, and each of the plurality of drainage channel holes 2F in second member 2 are connected sequentially from top to bottom to form each of the plurality of drainage channel holes 12. Each of the plurality of drainage channel holes 2E, each of the plurality of drainage channel holes 1E, each of the plurality of drainage channel holes 3E, each of the plurality of drainage channel holes 4E, and each of the plurality of drainage channel holes 2F are disposed to be overlaid on one another in the direction inclined to up-down direction C. The extending direction of each of the plurality of drainage channel holes 12 is inclined to up-down direction C.

<Functions and Effects>

Distributor 110 according to the tenth embodiment is provided with a plurality of drainage channel holes 12 extending from upper surface 110A to side surface 110B between the plurality of third through holes 2B, into which the lower ends of the plurality of heat transfer tubes 200 are introduced. Thus, according to distributor 110, liquid such as water having flown through the plurality of heat transfer tubes 200 to upper surface 110A can be discharged through the plurality of drainage channel holes 12 to side surface 110B of distributor 110. Accordingly, in distributor 110, for example, when dew condensation water produced by the defrosting operation on the fins and heat transfer tubes 200 is discharged through each heat transfer tube 200 in the downward direction, accumulation of such dew condensation water on upper surface 110A is prevented. Consequently, the heat exchanger including distributor 110 can immediately discharge the dew condensation water produced during the defrosting operation in the downward direction. Thus, the heating operation can be performed with high efficiency while corrosion of distributor 110 due to accumulation of dew condensation water is suppressed.

Since the plurality of drainage channel holes 12 are not connected to each of first space S1, second space S2 and third space S3, distributor 110 has the same refrigerant distribution performance as that of the distributor according to the fourth embodiment.

<Modifications>

The distributor according to the tenth embodiment has basically the same configuration as that of any one of the distributors according to the first to third and fifth to eighth embodiments, but may be different therefrom in that drainage channel hole 12 is provided that extends from upper surface 110A to side surface 110B and is not connected to each of first space S1, second space S2 and third space S3.

For example, in the distributor according to the tenth embodiment having the same configuration as that of distributor 100 according to the first embodiment, drainage channel hole 12 only has to be spaced apart from first through hole 1A, second through hole 3A, third through hole 2B and fourth through hole 1B in at least one of first direction A and second direction B.

For example, in the distributor according to the tenth embodiment having the same configuration as those of distributors 101 and 102 according to the second and third embodiments, drainage channel hole 12 only has to be spaced apart from first through hole 1A, groove 2A, second through hole 3A, third through hole 7A, and fifth through hole 5A in at least one of first direction A and second direction B.

The inner circumferential surface of drainage channel hole 12 may be provided with protrusions and recesses. The top portions and the bottom portions in each of the protrusions and recesses extend in up-down direction C. In this way, the dew condensation water having flown into the plurality of drainage channel holes 12 can be more effectively discharged through these protrusions and recesses.

Figure 31:
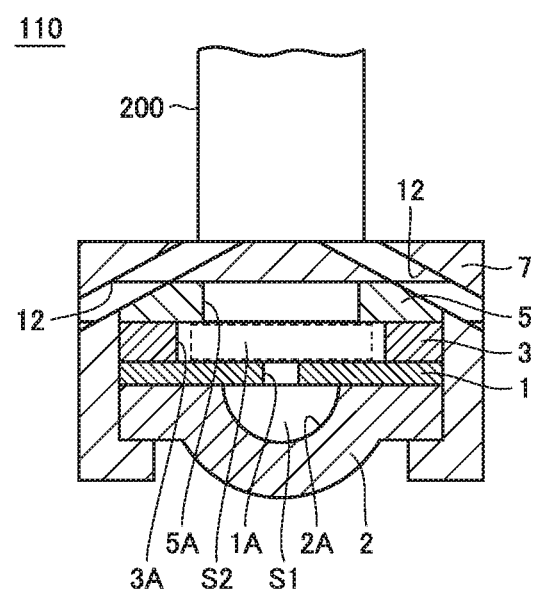
FIG. 31 is a cross-sectional view of a modification of the distributor according to the tenth embodiment, which is perpendicular to the first direction.
Figure 32:
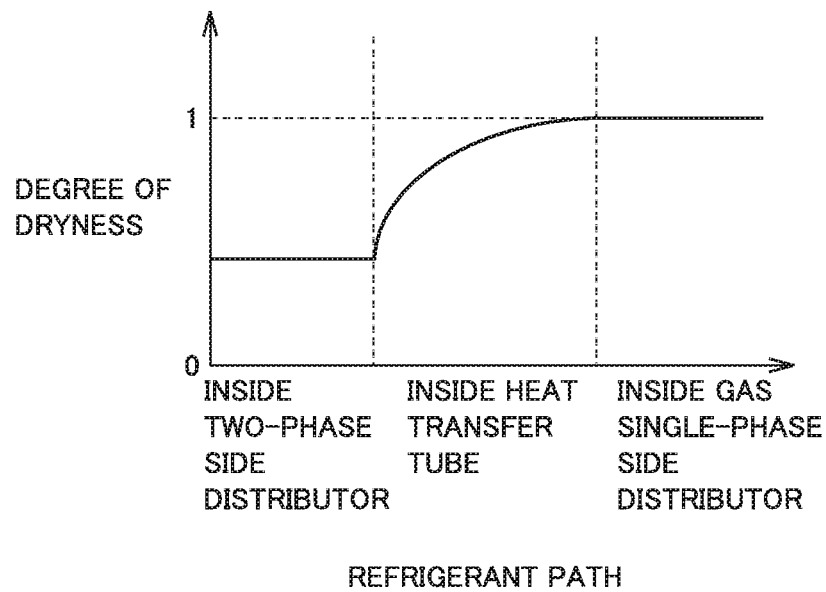
FIG. 32 is a graph showing the distribution of the degree of dryness in the conventional vertical heat exchanger operating as an evaporator, in which a horizontal axis shows a refrigerant path inside the vertical heat exchanger while a vertical axis shows the degree of dryness in each refrigerant path.
Figure 33:
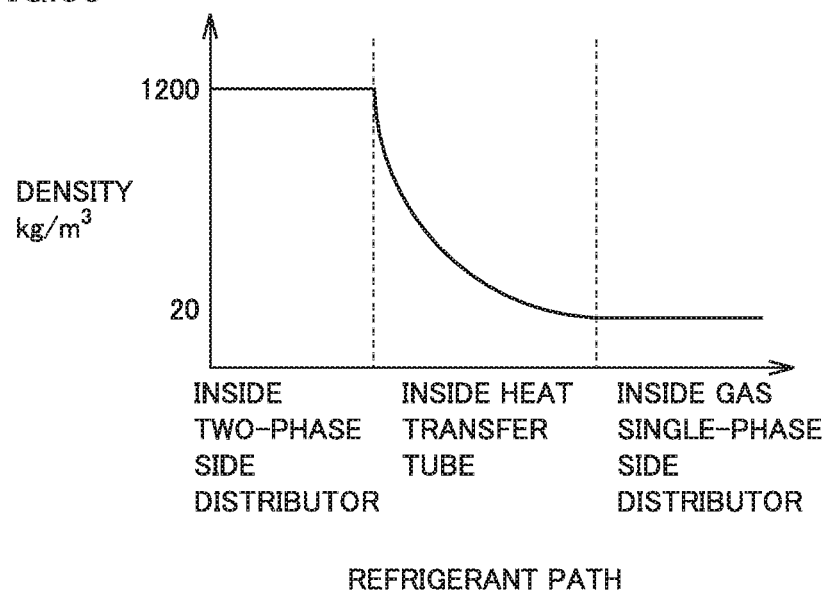
FIG. 33 is a graph showing the density distribution in the conventional vertical heat exchanger operating as an evaporator, in which a horizontal axis shows a refrigerant path inside the vertical heat exchanger while a vertical axis shows the density (unit: $kg/m^3$) in each refrigerant path.

In the distributor according to the tenth embodiment, a plurality of drainage channel holes 12 may be provided to be spaced apart from each other in second direction B. As shown in FIG. 31, the distributor according to the tenth embodiment may be provided with: a drainage channel hole 12 extending from upper surface 110A to one side surface 110B and not connected to each of first space S1, second space S2 and third space S3; and a drainage channel hole 12 extending from upper surface 110A to the other side surface 110B and not connected to each of first space S1, second space S2 and third space S3.

In addition, the heat transfer tube of the heat exchanger according to each of the first to tenth embodiments is not limited to a flat tube but may be a circular tube. In this case, in the distributor according to each of first to tenth embodiments, the planar shape of each of third through holes 2B and 7A as seen in up-down direction C may be a circular shape.

Although the embodiments of the present invention have been described as above, the above-described embodiments may be variously modified. Furthermore, the scope of the present invention is not limited to above-described embodiments. The scope of the present invention is defined by the terms of the claims, and is intended to include any modifications within the meaning and scope equivalent to the terms of the claims.

The invention claimed is:

1. A distributor configured to distribute refrigerant to each of a plurality of heat transfer tubes extending in an up-down direction, the plurality of heat transfer tubes being spaced apart from each other in a first direction crossing the up-down direction, the distributor comprising:
   a first member having a plurality of first through holes spaced apart from each other in the first direction;
   a second member having a first groove facing each of the plurality of first through holes;
   a third member having at least one second groove provided to face at least one of the plurality of first through holes; and
   an outer member having an upper surface of the distributor, the outer member being disposed above the third member and facing at least a part of the at least one second groove, wherein
   the first groove extends in the first direction,
   a first space inside the first groove and a second space inside the at least one second groove are connected to each other through a third space inside each of the plurality of first through holes,
   the third space is smaller in a flow passage area than the first space and the second space,
   a length of an opening end of the first groove in a second direction crossing the up-down direction and the first direction is longer than an inner diameter of each of the plurality of the first through holes in the second direction,
   the upper surface of the outer member is provided with a plurality of third through holes facing the at least one second groove, the plurality of third through holes being spaced apart from each other in the first direction,
   each of the plurality of third through holes has a long-side direction extending in the second direction, and
   the third space is disposed on a same side of the second space as each of the plurality of third through holes as seen from the vertical direction.

2. The distributor according to claim 1, wherein
the third member is provided with a plurality of second grooves spaced apart from each other in the first direction, and
a long-side direction of each of the plurality of second grooves extends in the second direction.

3. The distributor according to claim 1, wherein at least one end of the first space in the first direction has a semicircular cross-sectional shape perpendicular to the up-down direction.

4. The distributor according to claim 1, wherein
the plurality of first through holes comprise a first group of first through holes and a second group of first through holes, the first group of first through holes being spaced apart from the second group of first through holes in the first direction,
each of the plurality of first through holes in the first group of first through holes is spaced apart from each of the plurality of first through holes in the second group of first through holes in the second direction, and
each of the plurality of first through holes in the first group of first through holes is smaller in opening area than each of the plurality of first through holes in the second group of first through holes.

5. The distributor according to claim 4, further comprising a plurality of partition members spaced apart from each other in the first direction inside the first space, wherein
each of the plurality of partition members is disposed between the plurality of first through holes in the first group of first through holes as seen from the first space.

6. The distributor according to claim 1, further comprising an inflow portion through which refrigerant flows into the first space, wherein
a first through hole among the plurality of first through holes that is located relatively far away from the inflow portion in the first direction is smaller in opening area than a first through hole among the plurality of first through holes that is located relatively close to the inflow portion in the first direction.

7. The distributor according to claim 1, wherein
the distributor has
a bottom surface located on an opposite side of the upper surface, and
a drainage channel hole extending from the upper surface to the bottom surface, the drainage channel hole being not connected to each of the first space, the second space, and the third space,
the drainage channel hole is formed by a drainage channel hole in the second member, a drainage channel hole in the first member, and a drainage channel hole in the third member that are connected sequentially from top to bottom.

8. The distributor according to claim 1, wherein
the outer member further has
a side surface extending in a direction crossing the upper surface, and
a drainage channel hole extending from the upper surface to the side surface, the drainage channel hole being not connected to each of the first space, the second space, and the third space,
the drainage channel hole is formed by a drainage channel hole in the second member, a drainage channel hole in the first member, and a drainage channel hole in the third member that are connected sequentially from top to bottom.

9. A heat exchanger comprising:
the distributor according to claim 1; and
the plurality of heat transfer tubes each introduced into a corresponding one of the plurality of third through holes, wherein
each of the plurality of heat transfer tubes has a plurality of spaces that are spaced apart from each other in the second direction, and
the second space is larger in a flow passage area than each of the plurality of spaces.

10. A distributor configured to distribute refrigerant to each of a plurality of heat transfer tubes extending in an up-down direction, the plurality of heat transfer tubes being spaced apart from each other in a first direction crossing the up-down direction, the distributor comprising:
a first member having a plurality of first through holes spaced apart from each other in the first direction;
a second member having a first groove facing each of the plurality of first through holes;
a third member having at least one second groove provided to face at least one of the plurality of first through holes; and
an outer member having an upper surface of the distributor, the outer member being disposed above the third member and facing at least a part of the at least one second groove, wherein
the first groove extends in the first direction,
a first space inside the first groove and a second space inside the at least one second groove are connected to each other through a third space inside each of the plurality of first through holes, and
the third space is smaller in a flow passage area than the first space and the second space,
a length of an opening end of the first groove in a second direction crossing the up-down direction and the first direction is longer than an inner diameter of each of the plurality of the first through holes in the second direction,
the upper surface of the outer member is provided with a plurality of third through holes facing the at least one second groove, the plurality of third through holes being spaced apart from each other in the first direction,
each of the plurality of third through holes has a long-side direction extending in the second direction,
the third space is disposed on a same side of each of the plurality of third through holes as seen from the second space,
the first member is provided with a plurality of fourth through holes spaced apart from each other in the first direction,
each of the plurality of first through holes is spaced apart from each of the plurality of fourth through holes in the second direction,
the second member is formed integrally with the outer member,
the second member has a bent portion protruding upward and extending in the first direction,
the first groove is disposed inside the bent portion and spaced apart from each of the plurality of third through holes in the second direction,
the at least one second groove is provided in the third member as a second through hole facing each of the plurality of first through holes and each of the plurality of fourth through holes,
the distributor further comprises a fourth member, the second member, the first member, the third member, and the fourth member are sequentially stacked from top to bottom, the fourth member is configured to cover a lower portion of the at least one second through hole, an inner diameter of each of the plurality of third through holes in the second direction is longer than a length of each of the plurality of heat transfer tubes in the second direction, and an inner diameter of each of the plurality of fourth through holes in the second direction is shorter than a length of each of the plurality of heat transfer tubes in the second direction.

11. The distributor according to claim 10, wherein
each of the first member, the third member and the fourth member is formed of a plate-shaped member, and
the second member is configured to caulk the first member, the third member and the fourth member that are stacked.

12. A distributor configured to distribute refrigerant to each of a plurality of heat transfer tubes extending in an up-down direction, the plurality of heat transfer tubes being spaced apart from each other in a first direction crossing the up-down direction, the distributor comprising:
a first member having a plurality of first through holes spaced apart from each other in the first direction;
a second member having a first groove facing each of the plurality of first through holes;
a third member having at least one second groove provided to face at least one of the plurality of first through holes; and
an outer member having an upper surface of the distributor, the outer member being disposed above the third member and facing at least a part of the at least one second groove, wherein
the first groove extends in the first direction,
a first space inside the first groove and a second space inside the at least one second groove are connected to each other through a third space inside each of the plurality of first through holes,
the third space is smaller in a flow passage area than the first space and the second space,
a length of an opening end of the first groove in a second direction crossing the up-down direction and the first direction is longer than an inner diameter of each of the plurality of the first through holes in the second direction,
the upper surface of the outer member is provided with a plurality of third through holes facing the at least one second groove, the plurality of third through holes being spaced apart from each other in the first direction,
each of the plurality of third through holes has a long-side direction extending in the second direction,
a third direction extending from the first space through the third space to the second space corresponds to the second direction,
a fourth direction extending from the second space to each of the plurality of third through holes is directed downward,
the distributor further comprises
a fifth member, and
a sixth member,
the fifth member is provided with a plurality of fifth through holes spaced apart from each other in the first direction, the at least one second groove is provided in the third member as a second through hole facing each of the plurality of first through holes and each of the plurality of fifth through holes, the outer member, the fifth member, the third member, and the sixth member are sequentially stacked from top to bottom, the sixth member is configured to cover a lower portion of the at least one second through hole, and the first member is formed integrally with one of the fifth member, the third member, and the sixth member.

13. The distributor according to claim 12, wherein
the second member has a bent portion protruding in the second direction and extending in the first direction,
the first groove is provided inside the bent portion,
an inner diameter of each of the plurality of third through holes in the second direction is longer than a length of each of the plurality of heat transfer tubes in the second direction, and
an inner diameter of each of the plurality of fifth through holes in the second direction is shorter than a length of each of the plurality of heat transfer tubes in the second direction.

14. The distributor according to claim 13, wherein
each of the first member, the second member, the third member, and the fifth member is formed of a plate-shaped member, and
the outer member is configured to caulk at least the first member, the third member and the fifth member that are stacked.

15. A distributor configured to distribute refrigerant to each of a plurality of heat transfer tubes extending in an up-down direction, the plurality of heat transfer tubes being spaced apart from each other in a first direction crossing the up-down direction, the distributor comprising:
a first member having a plurality of first through holes spaced apart from each other in the first direction;
a second member having a first groove facing each of the plurality of first through holes;
a third member having at least one second groove provided to face at least one of the plurality of first through holes; and
an outer member having an upper surface of the distributor, the outer member being disposed above the third member and facing at least a part of the at least one second groove, wherein
the first groove extends in the first direction,
a first space inside the first groove and a second space inside the at least one second groove are connected to each other through a third space inside each of the plurality of first through holes,
the third space is smaller in a flow passage area than the first space and the second space,
a length of an opening end of the first groove in a second direction crossing the up-down direction and the first direction is longer than an inner diameter of each of the plurality of the first through holes in the second direction,
the upper surface of the outer member is provided with a plurality of third through holes facing the at least one second groove, the plurality of third through holes being spaced apart from each other in the first direction,
each of the plurality of third through holes has a long-side direction extending in the second direction,
the third space is disposed on an opposite side of each of the plurality of third through holes as seen from the second space, the distributor further comprises a fifth member,
the fifth member is provided with a plurality of fifth through holes spaced apart from each other in the first direction,
the at least one second groove is provided in the third member as a second through hole facing each of the plurality of first through holes and each of the plurality of fifth through holes, and
the outer member, the fifth member, the third member, the first member, and the second member are stacked sequentially from top to bottom.

16. The distributor according to claim 15, wherein
the second member has a bent portion protruding downward and extending in the first direction,
the first groove is disposed inside the bent portion,
an inner diameter of each of the plurality of third through holes in the second direction is longer than a length of each of the plurality of heat transfer tubes in the second direction, and
an inner diameter of each of the plurality of fifth through holes in the second direction is shorter than a length of each of the plurality of heat transfer tubes in the second direction.

\* \* \* \* \*